United States Patent
Sakai

(10) Patent No.: US 8,069,736 B2
(45) Date of Patent: Dec. 6, 2011

(54) TORQUE SENSOR

(75) Inventor: Masahiko Sakai, Kanagawa (JP)

(73) Assignee: Ono Sokki Co., Ltd., Kanagawa (JP)

( * ) Notice: Subject to any disclaimer, the term of this patent is extended or adjusted under 35 U.S.C. 154(b) by 295 days.

(21) Appl. No.: 12/569,382

(22) Filed: Sep. 29, 2009

(65) Prior Publication Data

US 2010/0077870 A1    Apr. 1, 2010

(30) Foreign Application Priority Data

Sep. 30, 2008 (JP) ................................. 2008-252514
Sep. 30, 2008 (JP) ................................. 2008-252515
Oct. 10, 2008 (JP) ................................. 2008-263648
Oct. 10, 2008 (JP) ................................. 2008-263649
Jul. 8, 2009 (JP) ................................. 2009-161520

(51) Int. Cl.
*G01L 3/00* (2006.01)

(52) U.S. Cl. ......... 73/862.334; 73/862.333; 73/862.325; 73/862.331

(58) Field of Classification Search ............. 73/862.325, 73/862.331–862.336

See application file for complete search history.

(56) References Cited

U.S. PATENT DOCUMENTS

| | | | | |
|---|---|---|---|---|
| 4,356,732 A | * | 11/1982 | Hachtel et al. ............ | 73/862.331 |
| 4,448,084 A | * | 5/1984 | Dobler et al. ............. | 73/862.331 |
| 4,907,460 A | * | 3/1990 | Taniguchi et al. ......... | 73/862.331 |
| 5,083,468 A | * | 1/1992 | Dobler et al. ............. | 73/862.331 |
| 5,578,767 A | * | 11/1996 | Chikaraishi et al. ...... | 73/862.331 |
| 5,739,616 A | * | 4/1998 | Chikaraishi et al. ........... | 310/194 |
| 5,796,014 A | * | 8/1998 | Chikaraishi et al. ...... | 73/862.331 |
| 6,443,020 B1 | * | 9/2002 | Lin et al. ................... | 73/862.334 |
| 6,557,425 B2 | * | 5/2003 | Kamiya et al. ........... | 73/862.334 |
| 2002/0040608 A1 | * | 4/2002 | Kamiya et al. ........... | 73/862.334 |

FOREIGN PATENT DOCUMENTS

| | | |
|---|---|---|
| JP | 49-43217 A | 4/1974 |
| JP | 08-240491 A | 9/1996 |
| JP | 2008-268097 A | 11/2008 |

* cited by examiner

*Primary Examiner* — Lisa Caputo
*Assistant Examiner* — Jonathan Dunlap
(74) *Attorney, Agent, or Firm* — Kenealy Vaidya LLP

(57) ABSTRACT

The present invention aims at detecting torque with a high degree of precision, by suppressing influences such as disturbance and rotation dependency. An output side cylinder is provided with a reference slit, and an input side cylinder is provided with a first detection slit and a second detection slit, which overlap the reference slit, the overlap amount between the first detection slit and the reference slit changing inversely with the overlap amount between the second detection slit and the reference slit, magnetic flux is applied from the inner side of the input side cylinder by a first drive coil and a second drive coil, a measuring circuit detects a phase difference between a phase of a detection signal for detecting the magnetic flux by a first detection coil provided on a position facing to the first detection slit on the outer side of the output side cylinder, and a phase of a detection signal for detecting the magnetic flux by a second detection coil provided on a position facing to the second detection slit on the outer side of the output side cylinder, and based on the phase difference, a torsion amount of the torsion bar is calculated. The directions of the magnetic flux generated by the first drive coil and second drive coil are opposite to each other.

19 Claims, 13 Drawing Sheets

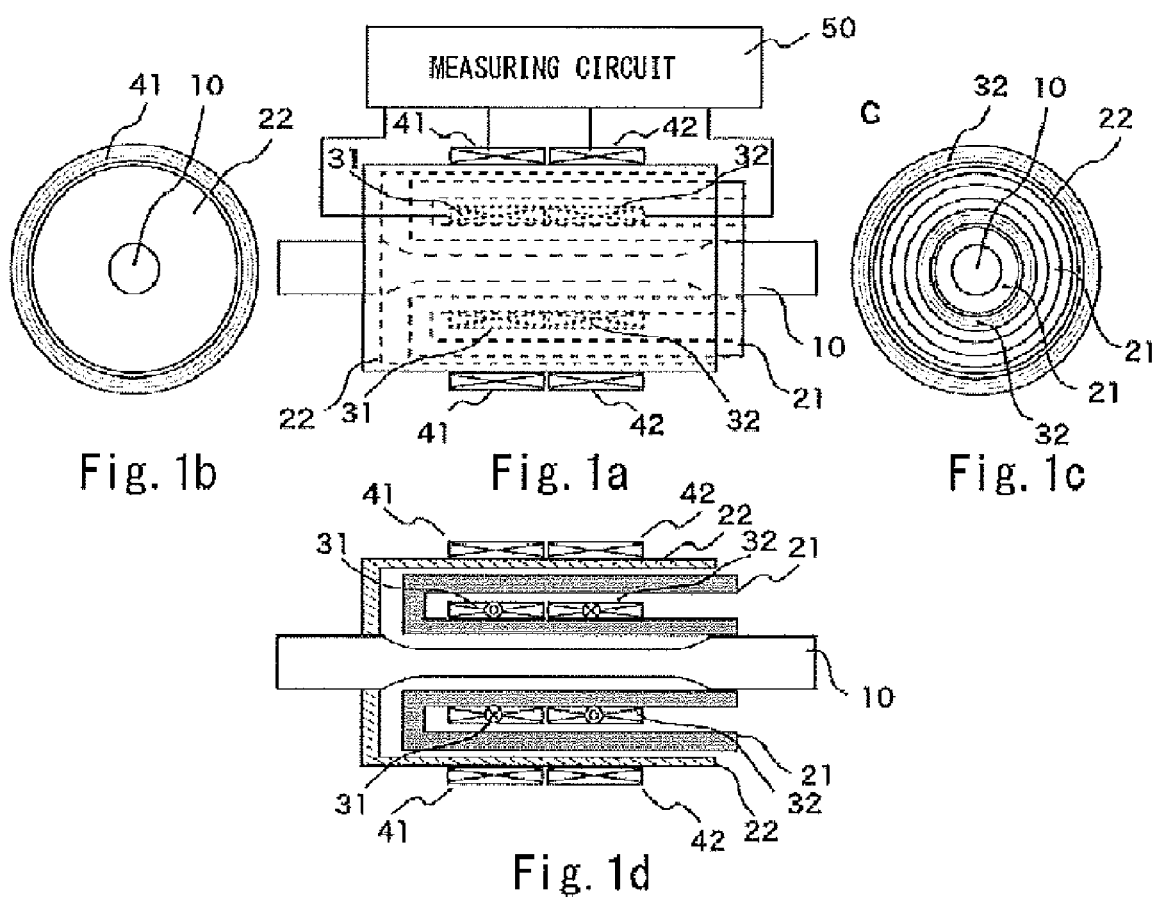

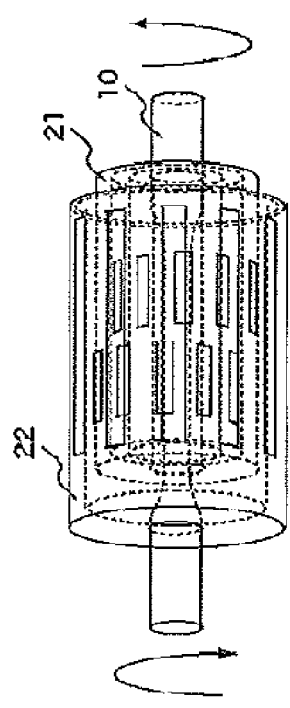
Fig. 2c
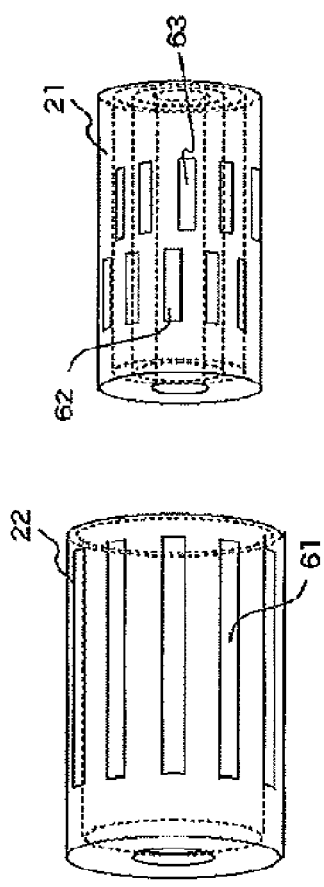
Fig. 2b
Fig. 2a

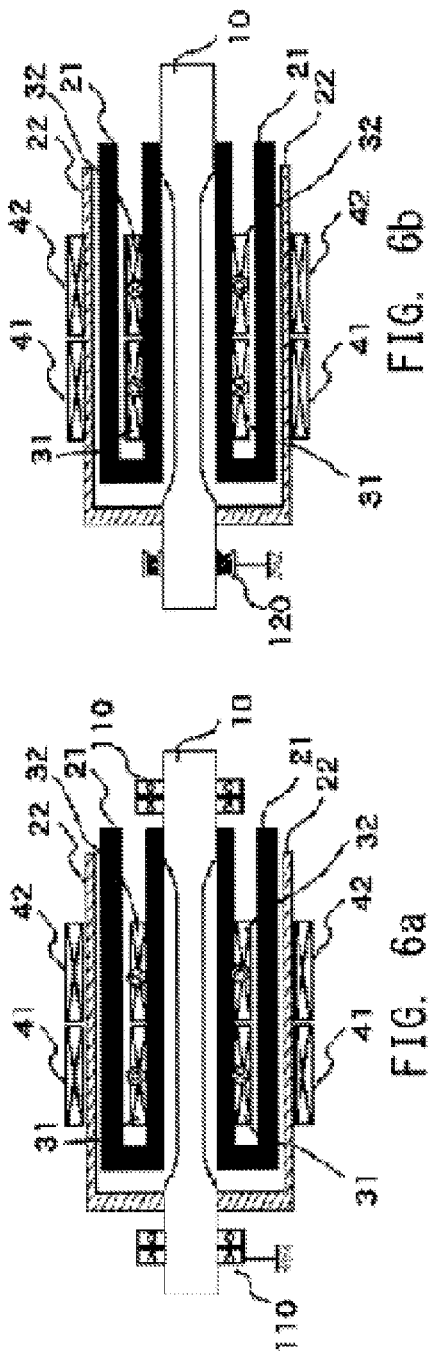
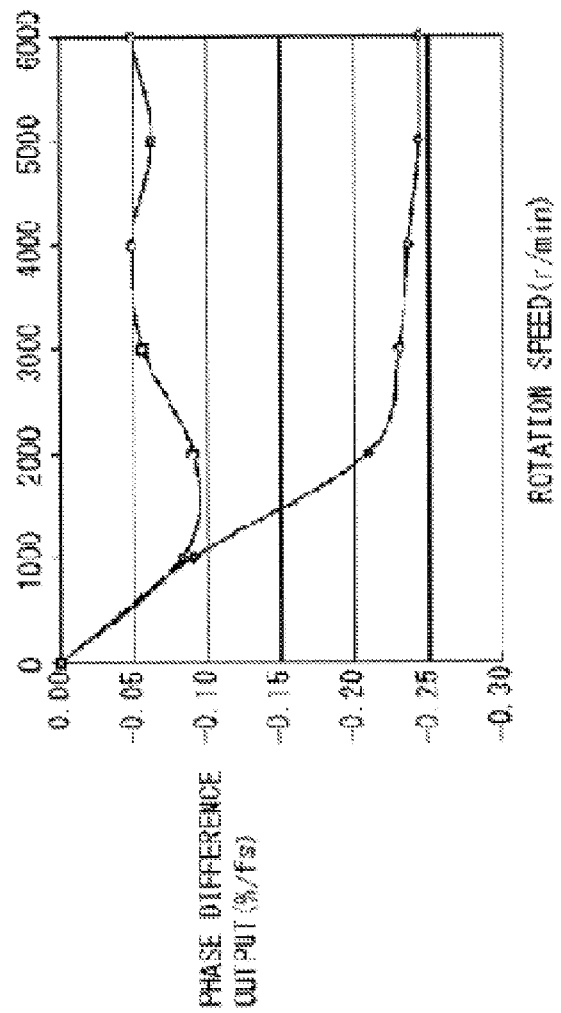

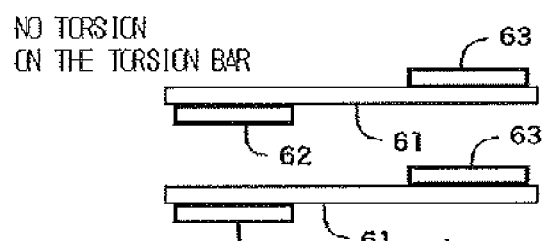
FIG. 8a1
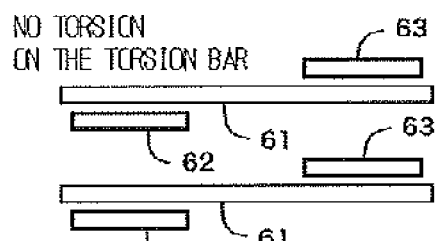
FIG. 8b1
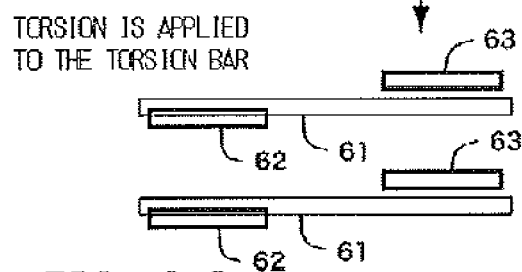
FIG. 8a2
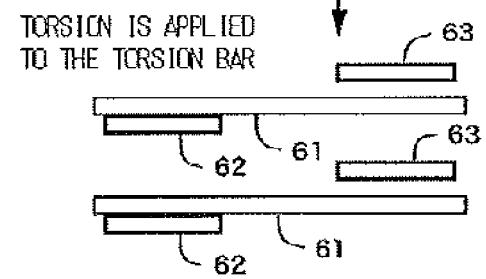
FIG. 8b2
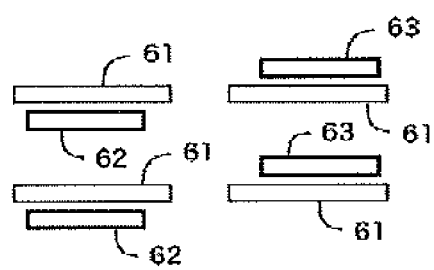
FIG. 8c
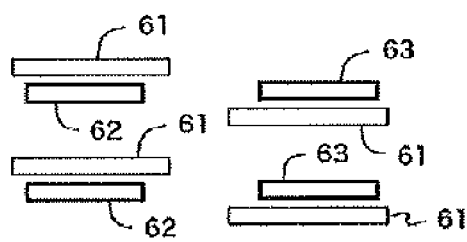
FIG. 8d

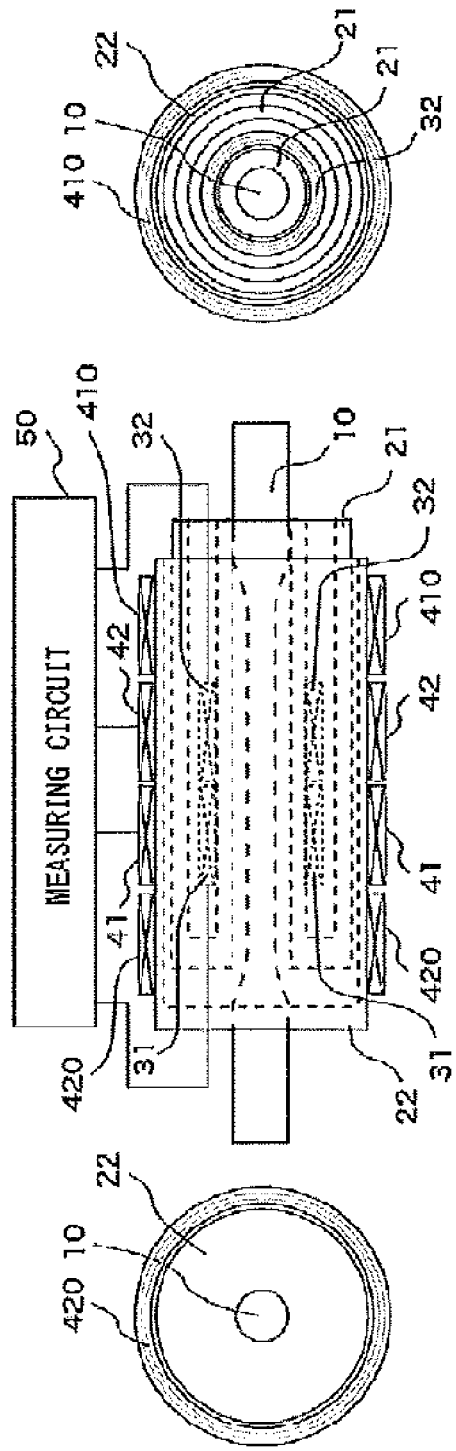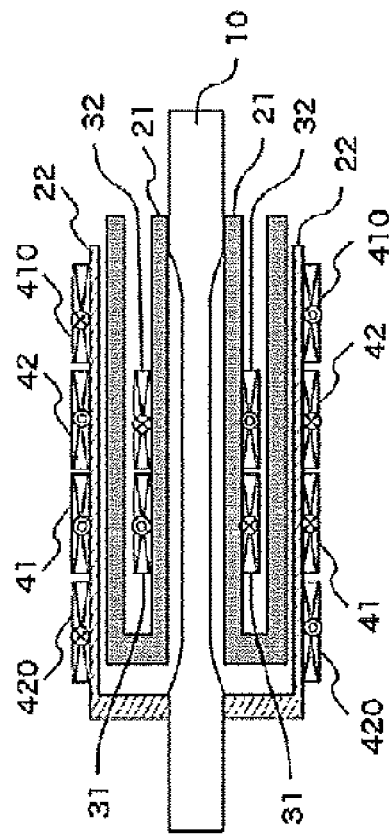

_(1)_

TORQUE SENSOR

This application claims the priority benefit under 35 U.S.C. §119 of Japanese Patent Application No. 2008-252514 filed on Sep. 30, 2008; Japanese Patent Application No. 2008-252515 filed on Sep. 30, 2008; Japanese Patent Application No. 2008-263648 filed on Oct. 10, 2008; Japanese Patent Application No. 2008-263649 filed on Oct. 10, 2008; and Japanese Patent Application No. 2009-161520 filed on Jul. 8, 2009, which are hereby incorporated in their entireties by reference.

FIELD OF THE INVENTION

The present invention relates to a torque sensor which measures torque by detecting a torsion angle of a torsion bar.

DESCRIPTION OF THE RELATED ART

As an example of the torque sensor to measure torque by detecting a torsion angle of the torsion bar, Japanese Unexamined Patent Application Publication No. 8-240491 (hereinafter, referred to as "patent document 1"), for instance, discloses a torque sensor, which is provided with grooves made of a magnetic substance on an input axis of the torsion bar, the grooves extending in the axial direction thereof, and a circular cylinder made of a non-magnetic conductor fixed on an output axis of the torsion bar, in such a manner as covering the input axis. In this torque sensor, the circular cylinder fixed on the output axis of the torsion bar, is provided with windows which overlap the grooves provided on the input axis in such a manner that the overlaps change variously according to the torsion of the torsion bar. With this configuration, magnitude of self-induced electromotive force is detected, which is generated in the coils fixedly arranged in such a manner as surrounding the windows.

In addition, it has been known conventionally that magnetic flux is applied on a conductor such as a metal to generate eddy current on the conductor, and by using this eddy current, it is possible to observe magnetic flux on a detection coil, whose phase has been changed according to a size and a structure of the conductor (for instance, Japanese Examined Patent Application Publication No. 49-43217 (hereinafter, referred to as "patent document 2")).

According to the technique described in the patent document 1, as an amount representing the torsion of the torsion bar, the magnitude of self-induced electromotive force is detected, whose change amount is very small relative to the change in torsion of the torsion bar. Therefore, there has been a problem that this amount is susceptible to influence of disturbance.

In view of this problem, the inventor of the present application previously proposed a torque sensor in which such disturbance influence can be eliminated (Japanese Patent Application No. 2007-113770). This torque sensor detects torque applied to the torsion bar, from a phase change of magnetic flux that has been made to pass through windows, the opening space thereof being changed in accordance with the torsion amount of the torsion bar.

However, in a subsequent study, it is found that this torque sensor may cause an error which is dependent on disturbance or a rotation speed.

In view of the result above, an object of the present invention is to eliminate the dependence on the influence of disturbance and the rotation speed, and to provide a torque sensor which is capable of detecting torque with a high degree of precision.

SUMMARY OF THE INVENTION

In order to solve the problem above, the present invention is directed to a torque sensor, incorporating a torsion bar, a first cylinder made of a non-magnetic conductor, being fixed on one end of the torsion bar, and arranged coaxially with the torsion bar, a second cylinder made of a non-magnetic conductor, being fixed on the other end of the torsion bar, and arranged coaxially with the torsion bar in the form of being inserted into the first cylinder, and a measuring part. Here, either one of the first cylinder and the second cylinder is provided with a reference slit, and either one of the first cylinder and the second cylinder, the cylinder not having the reference slit provided thereon, is provided with a first detection slit and a second detection slit, the first detection slit and second detection slit being placed at positions different in an axial direction. The measuring part is provided with, a drive coil arranged coaxially with the torsion bar, on one side; on either of the inner circumferential side of the second cylinder, and the outer circumferential side of the first cylinder, a detection coil arranged coaxially with the torsion bar, on the other side; on either side of the inner circumferential side of the second cylinder and the outer circumferential side of the first cylinder, on the side not having the drive coil arranged thereon, a drive circuit for subjecting the drive coil to AC driving, and a measuring circuit. the first detection slit and the second detection slit are arranged in such a manner that each position in the axial direction of the detection slits overlaps a position of the reference slit at least partially, and a position in the circumferential direction of the first detection slit with respect to a portion of the reference slit that the position in the axial direction of the first detection slit overlaps, is different from a position in the circumferential direction of the second detection slit with respect to a portion of the reference slit that the position in the axial direction of the second detection slit overlaps, the drive coil is made up of the first drive coil and the second drive coil placed at positions different in the axial direction, the detection coil is made up of the first detection coil and the second detection coil placed at positions different in the axial direction, the first drive coil and the first detection coil are arranged in such a manner that the positions thereof in the axial direction overlap the first detection slit at least partially, and the second drive coil and the second detection coil are arranged in such a manner that the positions thereof in the axial direction overlap the second detection slit at least partially, and the measuring circuit detects a phase difference between a voltage signal induced in the first detection coil, and a voltage signal induced in the second detection coil. A direction of magnetic flux generated by the first drive coil and a direction of magnetic flux generated by the second drive coil are opposite to each other.

With the torque sensor as described above, the direction of magnetic flux generated by the first drive coil and the direction of magnetic flux generated by the second drive coil are set to be opposite to each other, it is possible to suppress an occurrence of error which is dependent on the rotation of the torsion bar.

In the torque sensor as described above, it is also preferable to electrically connect the torsion bar to the ground level of the measuring circuit.

With this configuration, it is possible to suppress the occurrence of errors more effectively, which is dependent on the rotation of the torsion bar. It is to be noted that such grounding configuration as described above may also be applied to the case where one drive coil is provided instead of the first drive coil and the second drive coil, and accordingly, it is possible to suppress the occurrence of error which is dependent on rotation of the torsion bar.

In this torque sensor, it is preferable that the torsion bar and the first cylinder are electrically insulated, and the torsion bar and the second cylinder are electrically insulated.

With this configuration, it is possible to suppress an occurrence of error which is dependent on a rotation speed of the torsion bar when the measuring circuit detects a phase difference. It is to be noted that such insulating configuration as described above may also be applied to the case where one drive coil is provided instead of the first drive coil and the second drive coil, and accordingly, it is possible to suppress the occurrence of error which is dependent on rotation of the torsion bar.

In this torque sensor, it is further possible to configure such that in the state where there is no torsion on the torsion bar, a region in the circumferential direction of the first detection slit does not overlap a region in the circumferential direction of a portion of the reference slit, the portion overlapping the position in the axial direction of the first detection slit, and in the state where there is no torsion on the torsion bar, a region in the circumferential direction of the second detection slit does not overlap a region in the circumferential direction of a portion of the reference slit, the portion overlapping the position in the axial direction of the second detection slit.

With the configuration above, a phase difference being generated according to the torsion of the torsion bar is increased, between a voltage signal induced in the first detection coil and a voltage signal induced in the second detection coil, thereby enhancing the sensitivity of the torque sensor, and a linearity error of the phase difference detected by the measuring circuit according to the torsion of the torsion bar is reduced, thereby enhancing measurement precision of the torque sensor. Furthermore it may be configured such that, within a predetermined range of the torsion of the torsion bar, a region in the circumferential direction of the first detection slit does not overlap a region in the circumferential direction of a portion of the reference slit, the portion overlapping the position in the axial direction of the first detection slit, and a region in the circumferential direction of the second detection slit does not overlap a region in the circumferential direction of a portion of the reference slit, the portion overlapping the position in the axial direction of the second detection slit. With this configuration, the sensitivity of the torque sensor is further enhanced, and the linearity error of the phase difference detected by the measuring circuit according to the torsion of the torsion bar is reduced more. Therefore, the measurement precision of the torque sensor can be further improved.

It is to be noted that such configuration of the reference slit, the first detection slit, and the second detection slit as described above may also be applied to the case where one drive coil is provided instead of the first drive coil and the second drive coil, and accordingly, it is possible to suppress the occurrence of linearity error in the phase difference that is detected by the measuring circuit. In order to achieve the object above, the present invention is directed to a torque sensor, incorporating a torsion bar, a first cylinder made of a non-magnetic conductor, being fixed on one end of the torsion bar, and arranged coaxially with the torsion bar, a second cylinder made of a non-magnetic conductor, being fixed on the other end of the torsion bar, and arranged coaxially with the torsion bar in the form of being inserted into the first cylinder, and a measuring part, and either one of the first cylinder and the second cylinder is provided with a reference slit, either one of the first cylinder and the second cylinder, on the cylinder not having the reference slit provided thereon, is provided with a first detection slit and a second detection slit, the first detection slit and second detection slit being placed at positions different in an axial direction. The measuring part incorporates the first drive coil and the second drive coil being arranged on either one of the inner circumferential side of the second cylinder and the outer circumferential side of the first cylinder, coaxially with the rotation axis of the torsion bar, at positions respectively different in the axial direction, on the side where the drive coils are not arranged, either the inner circumferential side of the second cylinder or the outer circumferential side of the first cylinder, the first detection coil, the second detection coil, a first compensating coil, and a second compensating coil, being arranged at positions different in the axial direction, coaxially with the rotation axis of the torsion bar, a drive circuit for subjecting the drive coils to AC driving, and a measuring circuit. The first detection slit and the second detection slit are arranged in such a manner that each position in the axial direction of the detection slits overlaps a position in the axial direction of the reference slit at least partially, and the position in the circumferential direction of the first detection slit with respect to a portion of the reference slit that the position in the axial direction of the first detection slit overlaps, is different from a position in the circumferential direction of the second detection slit with respect to a portion of the reference slit that the position in the axial direction of the second detection slit overlaps, The first detection coil and the first compensating coil are connected in series, and the second detection coil and the second compensating coil are connected in series. A winding direction of wire of the first detection coil and the winding direction of wire of the first compensating coil are opposite to each other, a winding direction of wire of the second detection coil and the winding direction of wire of the second compensating coil are opposite to each other. The first drive coil and the first detection coil are arranged in such a manner that the positions in the axial direction overlap the first detection slit at least partially, the second drive coil and the second detection coil are arranged in such a manner that the positions in the axial direction overlap the second detection slit at least partially, and the first compensating coil and the second compensating coil are arranged in such a manner that the positions in the axial direction do not overlap the first detection slit and the second detection slit. The measuring circuit detects a phase difference between a voltage signal induced on both ends of the first detection coil and the first compensating coil being connected in series, and a voltage signal induced on both ends of the second detection coil and the second compensating coil being connected in series.

According to the torque sensor as described above, a signal component induced in the first detection coil by disturbance such as a noise is canceled out by a signal induced in the first compensating coil by the disturbance, and a signal component induced in the second detection coil by disturbance such as a noise is canceled out by a signal induced in the second compensating coil by the disturbance. Therefore, an influence due to the disturbance is suppressed, thereby enhancing the measurement precision.

In the torque sensor as described above, it is preferable that, as to the axial direction, the first detection coil is adjacent to the second detection coil, the first compensating coil is arranged in such a manner that the second detection coil is positioned between the first compensating coil and the first detection coil, and the second compensating coil is arranged in such a manner that the first detection coil is positioned between the second compensating coil and the second detection coil.

With the configuration as described above, most of an interfering component which is a signal component in the second detection coil induced by a magnetic flux component reaching to the second detection coil from the first drive coil, can be canceled out by a signal component in the second compensating coil induced by a magnetic flux component which reaches the second compensating coil from the first drive coil. Similarly, most of an interfering component which is a signal component in the first detection coil induced by a magnetic flux component reaching the first detection coil from the second drive coil, can be canceled out by a signal component in the first compensating coil induced by a magnetic flux component reaching the first compensating coil from the second drive coil. Accordingly, it is possible to keep the measurement precision from being deteriorated by the interference of the magnetic flux component, thereby enhancing the precision.

It is to be noted that the reference slit may be provided in divided manner; a first reference slit and a second reference slit positioned differently in the axial direction, a position of the former in the axial direction overlapping the position of the first detection slit at least partially, and a position of the latter in the axial direction overlapping the position of the second detection slit at least partially.

As discussed above, according to the present invention, a torque sensor which is able to eliminate dependency on the disturbance influence and the rotation speed is provided, and it is possible to detect torque with a high degree of precision.

BRIEF DESCRIPTION OF THE DRAWINGS

FIG. 1 illustrates a configuration of the torque sensor according to an embodiment of the present invention;

FIG. 2 illustrates a configuration of the torque sensor according to an embodiment of the present invention;

FIG. 6 illustrates a configuration example where the torsion bar of the torque sensor is grounded according to an embodiment of the present invention, and a result of a comparative experiment representing an effect of the grounding;

FIG. 8 illustrates preferred arrangements of the slits of the torque sensor according to an embodiment of the present invention;

FIG. 11 illustrates a configuration example where compensating coils are provided in the measuring circuit of the torque sensor according to an embodiment of the present invention;

DESCRIPTION OF THE PREFERRED EMBODIMENTS

Figure 3:
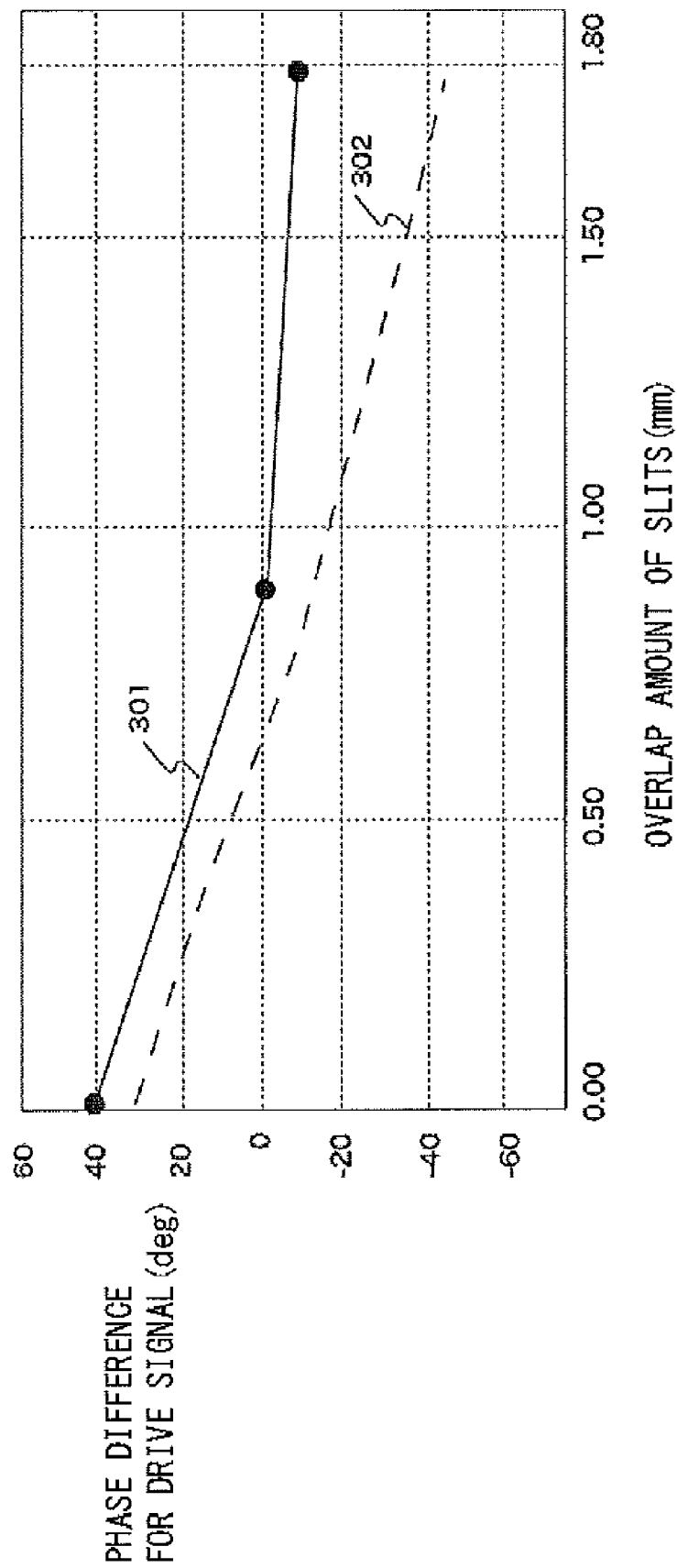
FIG. 3 is a chart showing a relationship between overlap width of slits and the phase change according to an embodiment of the present invention.

Hereinafter, an embodiment of the present invention will be explained.

Firstly, a first embodiment will be explained.

FIG. 1a, 1b, 1c, and 1d illustrate a torque sensor according to the first embodiment.

Here, each figure schematically illustrates the torque sensor; FIG. 1a is a front view, FIG. 1b is a left side view, FIG. 1c is a right side view, and FIG. 1d is a sectional view.

As illustrated, the torque sensor incorporates a torsion bar 10 on which torque as a measuring object is applied as a force in the twist direction between the input side end (the right direction in FIG. 1a and FIG. 1d) and the output side end (the left direction in FIG. 1a and FIG. 1d), an input side cylinder 21 which is fixed on the input side of the torsion bar 10, an output side cylinder 22 which is fixed on the output side of the torsion bar 10, a first drive coil 31, a second drive coil 32, a first detection coil 41, a second detection coil 42, and a measuring circuit 50. It is to be noted that the first drive coil 31 and the second coil 32 are connected in series.

Here, the output side cylinder 22 is made of a non-magnetic conductor, and it has a cylindrical shape whose bottom is opened on the input side of the torsion bar 10. The output side cylinder 22 is fixed on the output side of the torsion bar 10, at a central portion of the bottom which is on the output side of the torsion bar 10.

The input side cylinder 21 is made of a non-magnetic conductor, having two hollow cylindrically shaped portions; an inner cylindrical portion and an outer cylindrical portion, both being arranged at a certain distance therebetween in a manner of concentrically nested and neither of them having bottom surfaces, and those two portions being joined on the output side end of the torsion bar 10. The inner cylindrical portion, being the cylindrical shape portion on the inner side of the input side cylinder 21, is fixed on the input side of the torsion bar 10. Further, the input side cylinder 21 is provided so that it is placed inside the output side cylinder 22 in such a manner as nested concentrically with the output side cylinder 22.

The first detection coil 41 and the second detection coil 42 are provided side by side along the axial direction in such a manner as wound around the rotation axis of the torsion bar 10, coaxially therewith, so as to establish an arrangement that the output side cylinder 22 is inserted in the central hole of the coils.

The first drive coil 31 is placed between the inner cylindrical portion and the outer cylindrical portion of the input side cylinder 21, in such a manner as facing to the first detection coil 41 through the outer cylindrical portion of the input side cylinder 21 and a side wall of the output side cylinder 22, the first drive coil being wound around the rotation axis of the torsion bar 10 coaxially therewith. The second drive coil 32 is placed between the inner cylindrical portion and the outer cylindrical portion of the input side cylinder 21, in such a manner as facing to the second detection coil 42 through the outer cylindrical portion of the input side cylinder 21 and the side wall of the output side cylinder 22, the second drive coil being wound around the rotation axis of the torsion bar 10 coaxially therewith.

As shown in FIG. 1*d*, a winding direction (i.e., a direction of generated magnetic flux) of the first drive coil 31 is opposite to that of the second drive coil 32.

It is to be noted that the first drive coil 31 and the second drive coil 32 may be provided fixedly on the overall torque sensor, i.e., on the static system, or those coils may be provided fixedly on the input side cylinder 21 in such a manner as rotatable therewith. The first detection coil 41 and the second detection coil 42 may also be provided fixedly on the static system, or those coils may be provided fixedly on the output side cylinder 22 in such a manner as rotatable therewith.

There are provided multiple slits respectively on the side wall of the output side cylinder 22 and on the outer cylindrical portion of the input side cylinder 21, at the position where the first drive coil 31 faces to the first detection coil 41, and at the position where the second drive coil 32 faces to the second detection coil 42.

Specifically, as shown in FIG. 2*a*, there are provided more than one reference slits 61 which are arranged in the circumferential direction on the side wall of the output side cylinder 22.

Further, as shown in FIG. 2*b*, on the outer cylindrical portion of the input side cylinder 21, there are provided first detection slits 62 at the position where the first drive coil 31 faces to the first detection coil 41, and second detection slits 63 are provided at the position where the second drive coil 32 faces to the second detection coil 42.

As shown in FIG. 2*c*, in the torque sensor, the reference slit 61 and the first detection slit 62 are placed in such a manner that a position in the axial direction of the reference slit 61 overlaps the position in the axial direction of the first detection slit 62. Similarly, the reference slit 61 and the second detection slit 63 are placed in such a manner that a position in the axial direction of the reference slit 61 overlaps the position in the axial direction of the second detection slit 63. As for the position in the circumferential direction, the reference slit 61, the first detection slit 62, and the second detection slit 63 are configured in such an arrangement that the first detection slit 62 and the second detection slit 63 are placed in the directions opposite to each other in the circumferential direction with respect to the reference slits 61. In other words, it is configured such that the center of a region in the circumferential direction of the first detection slit 62 and the center of a region in the circumferential direction of the second detection slit 63 are placed on the opposite positions with respect to the center of a region in the circumferential direction of the reference slit 61 (i.e., one is on the clockwise side and the other is on the anticlockwise side). More preferably, it is configured such that an absolute value of a distance from the center of the region in the circumferential direction of the reference slit 61 to the center of the region in the circumferential direction of the first detection slit 62 is equal to an absolute value of a distance from the center of the region in the circumferential direction of the reference slit 61 to the center of the region in the circumferential direction of the second detection slit 63.

For example as shown in FIG. 2*d*1, provided that the direction proceeding in the clockwise when viewed from the input side toward the output side is a forward direction, and the direction proceeding in the anticlockwise is as a backward direction, a phase of arrangement phase of each of the reference slit 61, the first detection slit 62, and the second detection slit 63 is established in such a manner that, in a state that there occurs no torsion on the torsion bar 10, a rear half of the reference slit 61 viewed in the radial direction overlaps the half front side of the first detection slit 62, and the front half of the reference slit 61 overlaps the half rear side of the second detection slit 63.

Here, FIG. 2*d*2 illustrates a case that there is no occurrence of torsion on the torsion bar 10 in the arrangement of FIG. 2*d*1, showing a state where the direction of the output side cylinder 22 is viewed from the first drive coil 31 and the second drive coil 32 side through the first detection slit 62 and the second detection slit 63. As illustrated, in the state above, the overlap amount (area) between the reference slit 61 and the first detection slit 62 is equal to the overlap amount between the reference slit 61 and the detection slit 63.

On the other hand, if torsion occurs on the torsion bar 10 in the arrangement as shown in FIG. 2*d*1, the overlap amount between the reference slit 61 and the first detection slit 62 and the overlap amount between the reference slit 61 and the second detection slit 63 are changed in inverse relationship in magnitude. In other words, for example, when the torsion as indicated by the arrows in FIG. 2*c* occurs on the torsion bar 10, the overlap amount between the reference slit 61 and the first detection slit 62 is increased, and the overlap amount between the reference slit 61 and the second detection slit 63 is decreased. FIG. 2*e*2 illustrates the state that the direction of the output side cylinder 22 is viewed from the first drive coil 31 through the first detection slit 62 and the second detection slit 63.

When the first drive coil 31 and the second drive coil 32 connected in series are driven by AC signals, along with the opposite changes in the overlap amount between the reference slit 61 and the first detection slit 62, and the overlap amount between the reference slit 61 and the second detection slit 63, different changes may occur in the phase of the detection signals which are detected by the first detection coil 41 and the second detection coil 42. Consequently, changes which are different depending on the torsion amount of the torsion bar 10 may occur in the phase of the detection signals detected by the first detection coil 41 and the second detection coil 42.

Here, it is presumed that the principle described below causes such different changes to occur in the phase of the detection signals detected by the first detection coil 41 and the second detection coil 42, along with the opposite changes in the overlap amount between the reference slit 61 and the first detection slit 62, and the overlap amount between the reference slit 61 and the second detection slit 63.

When the first drive coil 31 and the second drive coil 32 being connected in series are driven by AC signals, it is assumed as there are following components among the magnetic flux components detected by the first detection coil 41 and the second detection coil 42; the first magnetic flux component that has passed through both the reference slit 61 of the output side cylinder 22 and either of the first detection slit 62 or the second detection slit 63 of the input side cylinder 21, and has transmitted through neither the output side cylinder 22 nor the input side cylinder 21, the second magnetic flux component that has transmitted only through the output side cylinder 22, the third magnetic flux component that has transmitted only through the input side cylinder 21, and the fourth magnetic flux component that has transmitted through both the input side cylinder 21 and the output side cylinder 22. Here, the second magnetic flux component detected by the first detection coil 41 and the second detection coil 42 is a magnetic flux component that has been subjected to the phase change by the transmission through the output side cylinder 22. The third magnetic flux component is a magnetic flux component that has been subjected to the phase change by the transmission through the input side cylinder 21. The fourth magnetic flux component is a magnetic flux component that has been subjected to the phase change by the transmission through the input side cylinder 21 and the transmission through the output side cylinder 22.

As shown in FIG. 2e1, when the overlap amount between the reference slit 61 and the first detection slit 62 is increased, the intensity of the first magnetic flux component detected by the first detection coil 41 is increased, the intensity of the second magnetic flux component and that of the third magnetic flux component are decreased, and the intensity of the fourth magnetic flux component is increased. On the other hand, as shown in FIG. 2e1, when the overlap amount between the reference slit 61 and the second detection slit 63 is decreased, the intensity of the first magnetic flux component detected by the second detection coil 42 is decreased, the intensity of the second magnetic flux component and that of the third magnetic flux component are increased, and the intensity of the fourth magnetic flux component is decreased. That is, depending on the torsion amount of the torsion bar 10, the intensity of the magnetic flux component detected by the first detection coil 41 and the intensity of the magnetic flux component detected by the second detection coil 42 are changed inversely.

On the other hand, the detection signals detected by the first detection coil 41 and the second detection coil 42 become representing a synthesized vector of each of the magnetic flux components, and the phase of the synthesized vector is changed according to the intensity ratio of the magnetic flux components of respective phases. Therefore, the phase of the detection signal detected by the first detection coil 41 shows a change according to the change of the overlap amount between the reference slit 61 and the first detection slit 62, and the phase of the detection signals detected by the second detection coil 42 shows a change according to the change of the overlap amount between the reference slit 61 and the second detection slit 63. Consequently, in the phase of the detection signals detected by the first detection coil 41 and the second detection coil 42, there occurs a change which is different depending on the torsion amount of the torsion bar 10. Here, FIG. 3 illustrates a result 301 that was obtained by the following procedure: two aluminum plates of 2 mm in thickness, each having slits of 1.8 mm in width, were superimposed one on another; while changing the overlap amount of the slits, a drive coil provided on one side was driven to apply a magnetic flux, using a drive signal of 10 kHz, and a phase of a detection signal for the drive signal was measured, the detection signal being detected by a detection coil provided on the other side. From FIG. 3, it is understood that a phase change occurred in the detection signal in association with the change in the overlap amount of the slits. Reference numeral 302 in the figure indicates calculated values based on the principle as discussed above.

As thus described, different changes occur in the phase of the detection signals detected by the first detection coil 41 and the second detection coil 42, in accordance with the torsion amount of the torsion bar 10. Therefore, measuring the phase difference of the detection signals detected by the first detection coil 41 and the second detection coil 42 allows the measurement of a torsion amount of the torsion bar 10. According to this torsion amount being measured, it is possible to calculate the torque applied to the torsion bar 10.

Here, it is the measuring circuit 50 which drives the first drive coil 31 and the second drive coil 32 connected in series as described above, and performs the measurement.

Figure 4A:
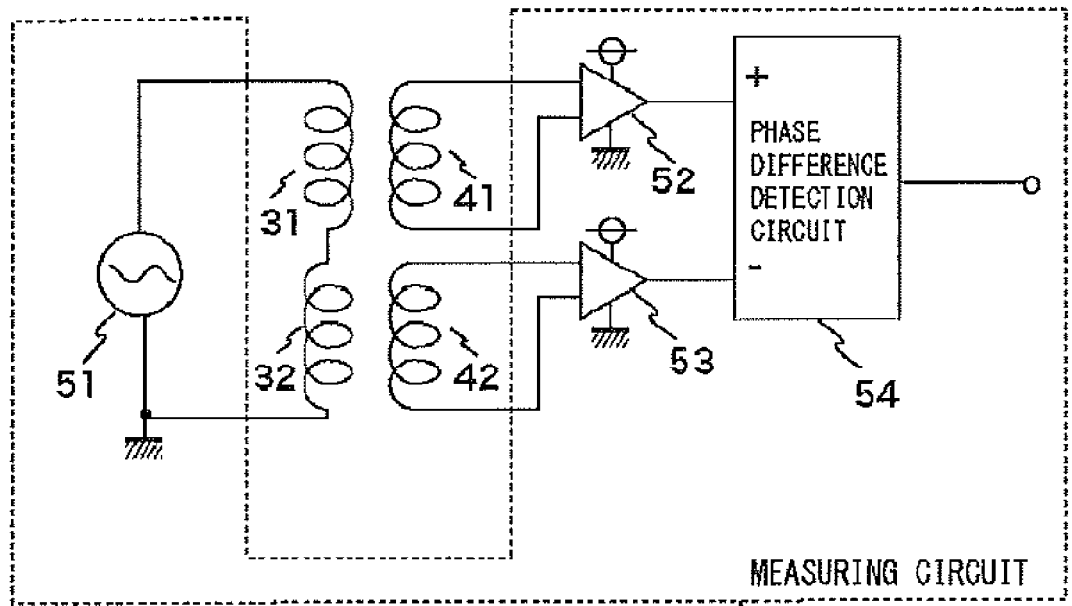
FIG. 4 illustrates configurations of a measuring circuit of the torque sensor according to an embodiment of the present invention.

Specifically, as shown in FIG. 4a, the measuring circuit 50 incorporates an oscillating circuit 51, a first differential amplifier 52, a second differential amplifier 53, and phase difference detection circuit 54. The oscillating circuit 51 generates AC drive signals which are applied to the first drive coil 31 and the second drive coil 32 to generate primary magnetic flux. The first differential amplifier 52 amplifies the detection signal in the first detection coil 41 generated by an induced electromotive force, and the second differential amplifier 53 amplifies the detection signal in the second detection coil 42 generated by an induced electromotive force.

The phase difference detection circuit 54 detects a phase difference between the detection signal of the first detection coil 41, which has been amplified by the first differential amplifier 52, and the detection signal of the second detection coil 42, which has been amplified by the second differential amplifier 53. Then, according to the magnitude of the phase difference detected by the phase difference detection circuit 54, it is possible to represent the torsion amount of the torsion bar 10, i.e., the torque applied to the torsion bar 10.

Here, an explanation will be made regarding the significance in setting the direction of the generated magnetic flux of the first drive coil 31 and that of the generated magnetic flux of the second drive coil 32 to be opposite to each other, as described above.

Figure 5A:
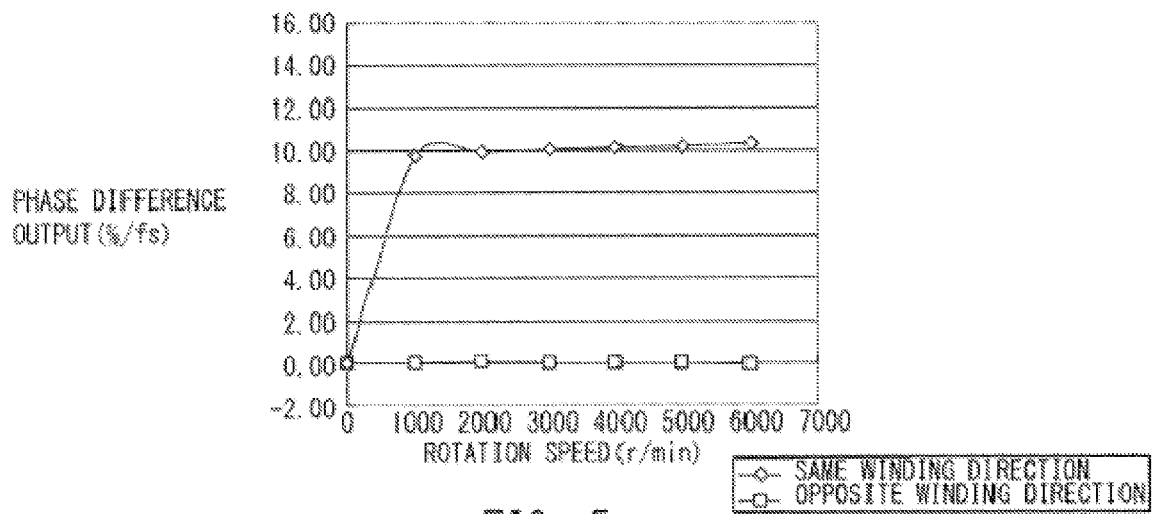
FIG. 5 illustrates results of comparative experiments regarding the torque sensor according to an embodiment of the present invention.
Figure 5B:
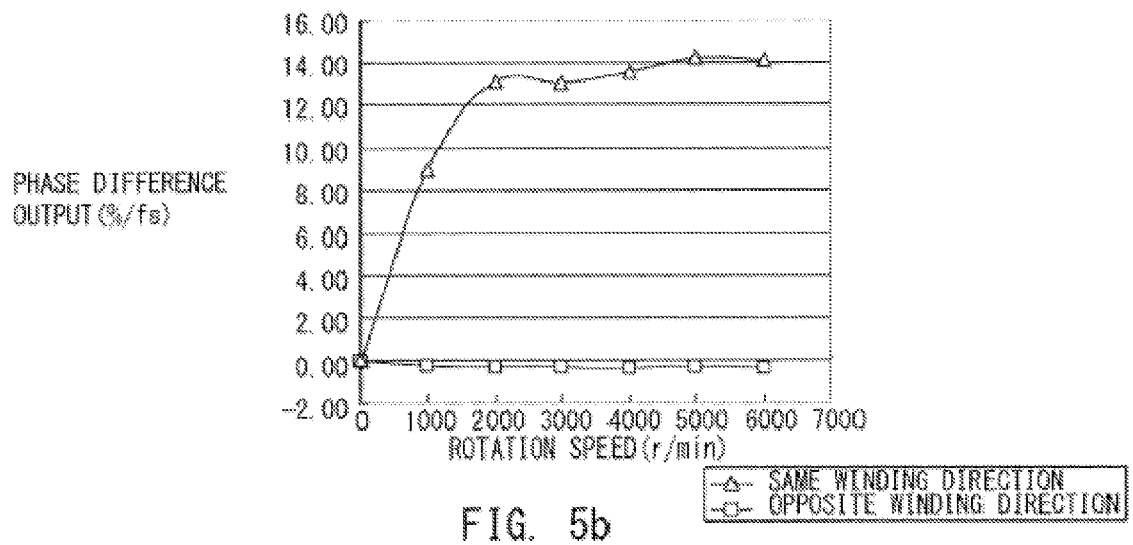

FIG. 5a and FIG. 5b show results of two examples of a comparative experiment; comparing the case where the directions of the generated magnetic flux were set to be the same between the first drive coil 31 and the second drive coil 32, with the case where the directions of the generated magnetic flux were set to be opposite to each other.

These results of the comparative experiment are represented by the ratio % of a phase difference output detected by the phase difference detection circuit 54 when the torsion bar 10 was rotated without applying torque, to a phase difference output FS when the maximum torque was applied within the range where the torque applied to the torsion bar 10 was proportional to the torsion angle of the torsion bar 10. It is to be noted that FIG. 5a and FIG. 5b represent the cases where the distance between the outer cylindrical portion of the input side cylinder 21 and the side wall of the output side cylinder 22 is made different. The comparative experiment above was performed under the following conditions; the drive frequency between the first drive coil 31 and the second drive coil 32 was set to be 20 kHz, the number of slits was 15, the length of the slit was 6 mm, the width of the slit was 2 mm, the material of the input side cylinder 21 was aluminum base alloy (A5056) with the thickness of 2 mm, the material of the output side cylinder 22 was aluminum base alloy (A5056) with the thickness of 2 mm, a distance between the input side cylinder 21 and the output side cylinder 22 was set to be 0.5 mm, and a distance (radius) from the rotation center axis to the central position of the space between the input side cylinder 21 and the output side cylinder 22 was set to be 50 mm.

As illustrated, the phase difference outputs, indicated by rhombus-shaped marks in FIG. 5a and by triangular marks in FIG. 5b, were changed depending on the change of the rotation speed r/min, in the case where the direction of the generated magnetic flux in the first drive coil 31 was set to be the same as that of the generated magnetic flux in the second drive coil 32. On the other hand, the phase difference outputs, indicated by square marks in FIG. 5a and in FIG. 5b, were kept to be approximately zero without depending on the change of the rotation speed r/min, in the case where the direction of the generated magnetic flux in the first drive coil 31 was set to be opposite to that of the generated magnetic flux in the second drive coil 32.

Therefore, it is understood from results of the comparative experiment that when the direction of the generated magnetic flux of the first drive coil 31 is set to be opposite to that of the generated magnetic flux of the second drive coil 32, it is possible to suppress an error which is dependent on the rotation of the torsion bar 10.

Here, the following is conceivable as the reason why an error depending on the rotation of the torsion bar 10 is suppressible by setting the winding direction of the first drive coil 31 to be opposite to that of the second drive coil 32; an unbalance such as electromagnetic influence, which is amplified by the rotation of the torsion bar 10, between two magnetic circuits, i.e., the first magnetic circuit made up of the first drive coil 31 and the first detection coil 41, and the second magnetic circuit made up of the second drive coil 32 and the second detection coil 42, is eliminated by setting the direction of the generated magnetic flux in the first drive coil 31 to be opposite to that of the generated magnetic flux in the second drive coil 32.

In the discussion above, the embodiment of the present invention has been explained.

Figure 4B:
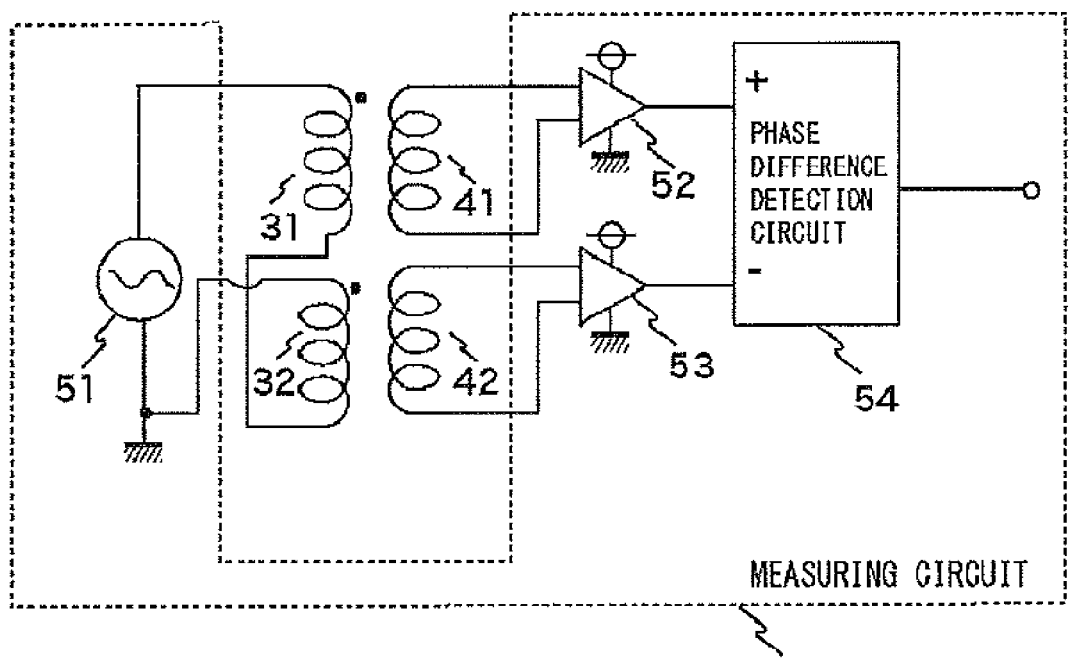

It is to be noted that in the embodiment described so far, the direction of the generated magnetic flux in the first drive coil 31 is set to be opposite to that of the generated magnetic flux in the second drive coil 32, by allowing the wires to be wound in the directions being opposite to each other. However, as shown in FIG. 4b, it is further possible that the winding direction of the wire is made physically the same between the first drive coil 31 and the second drive coil 32, and the drive signals are applied from the oscillating circuit 51 in the directions opposite to each other, thereby making one direction of the generated magnetic flux is made to be opposite to the other.

In the present embodiment as discussed above, it is also preferable that the torsion bar 10 is connected to a ground level of the measuring circuit 50 as well as the directions of the generated magnetic flux of the first drive coil 31 and of the second drive coil 32 are set to be opposite to each other.

Here, connecting the torsion bar 10 to the ground level of the measuring circuit 50 can be established, for example as shown in FIG. 6a, by installing bearings 110 using conductive grease as a lubrication material, respectively on both ends of the torsion bar 10, which rotatably support the torsion bar 10, and further by electrically conducting the torsion bar 10 and outer rings of the bearings, and connecting the outer rings of the bearings 110 to the ground level of the measuring circuit 50. Alternatively, as shown in FIG. 6b, a slip ring 120 is provided on the torsion bar 10, and a potential level of the torsion bar 10 may be connected to the ground level via the slip spring 120.

As thus described, by connecting the torsion bar 10 to the ground level of the measuring circuit 50, it is further possible to suppress an error which is dependent on the rotation on the torsion bar 10, as indicated by the result of the comparative experiment shown in FIG. 6c. This comparative experiment compares the following cases; where the torsion bar 10 was not connected to the ground level of the measuring circuit 50, and where the torsion bar 10 was connected to the ground level of the measuring circuit 50.

Specifically, the result of the comparative experiment as shown in FIG. 6c was represented by the ratio % of a phase difference output detected by the phase difference detection circuit 54 when the torsion bar 10 was rotated without applying the torque, to a phase difference output FS when the maximum torque was applied within the range where the torque applied to the torsion bar 10 was proportional to the torsion angle of the torsion bar 10. As illustrated, the phase difference output changed in a relatively larger scale, depending on the change of the rotation speed r/min, as indicated by the rhombus-shaped marks, in the case where the torsion bar 10 was not connected to the ground level of the measuring circuit 10. On the other hand, the phase difference output was kept approximately to zero without depending on the change of the rotation speed r/min, as indicated by square marks, in the case where the torsion bar 10 was connected to the ground level of the measuring circuit 50. The comparative experiment above was performed under the following conditions; the drive frequency of the first drive coil 31 and the second drive coil 32 was set to be 20 kHz, the number of slits was 10, the length of the slit was 6 mm, the width of the slit was 2 mm, the material of the input side cylinder 21 was aluminum base alloy (A5056) with the thickness of 2 mm, the material of the output side cylinder 22 was aluminum base alloy (A5056) with the thickness of 2 mm, a distance between the input side cylinder 21 and the output side cylinder 22 was set to be 0.5 mm, and a distance (radius) from the rotation center axis to the central position of the space between the input side cylinder 21 and the output side cylinder 22 was set to be 50 mm.

Accordingly, from the result of the comparative experiment, it is understood that an error which is dependent on the rotation of the torsion bar 10 can be suppressed, by connecting the torsion bar 10 to the ground level of the measuring circuit 50. Here, the following is conceivable as the reason why an error which is dependent on the rotation of the torsion bar 10 is suppressible by connecting the torsion bar 10 to the ground level of the measuring circuit 50; an unbalance such as electromagnetic influence, which is amplified by the rotation of the torsion bar 10, between two magnetic circuits, i.e., the first magnetic circuit made up of the first drive coil 31 and the first detection coil 41, and the second magnetic circuit made up of the second drive coil 32 and the second detection coil 42, may be eliminated by connecting the potential level of the torsion bar 10 to the ground level of the measuring circuit 50.

Figure 7A:
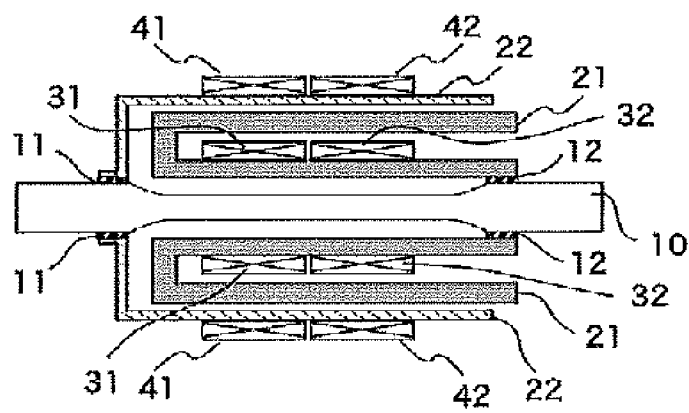
FIG. 7 illustrates a configuration example where an insulating member is provided in the torque sensor according to an embodiment of the present invention, and a result of a comparative experiment representing an effect of the insulation.

In the embodiment as described above, as shown in FIG. 7a, it is further possible to provide electrical isolation between the output side cylinder 22 and the torsion bar 10, and between the input side cylinder 21 and the torsion bar 10, by using an isolation members 11 and 12, respectively. Here in this example, an annular shaped member made of an insulating material may be employed as the insulating members 11 and 12. Alternatively, as the insulating members 11 and 12, an insulating resin may be pressed in between the output side cylinder 22 and the torsion bar 10, and between the input side cylinder 21 and the torsion bar 10, or insulating processing is applied to the surface of the torsion bar 10, or to the surfaces of the positions where the input side cylinder 21 and output side cylinder 22 are installed on the torsion bar 10.

Here, an explanation will be made regarding the significance to provide electrical isolation between the torsion bar 10 and the output side cylinder 22, and between the torsion bar 10 and the input side cylinder 21, by the use of the insulating members 11 and 12, respectively.

Figure 7B:
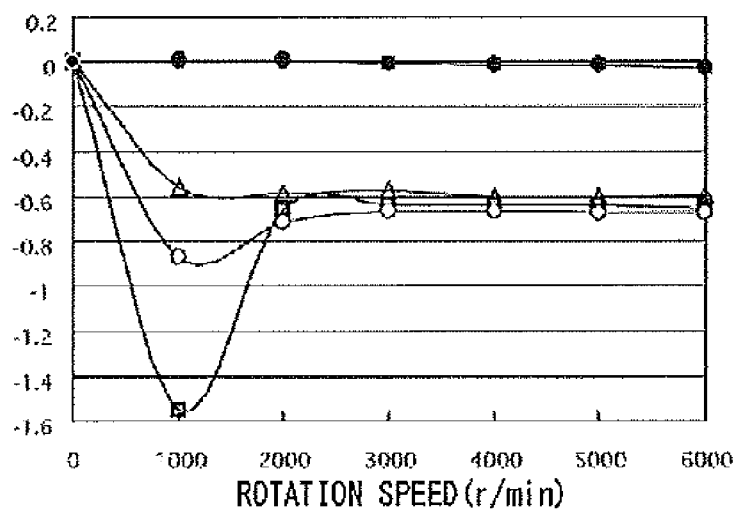

FIG. 7b shows a result of a comparative experiment, comparing the following cases; where the electrical isolation was provided between the torsion bar 10 and the output side cylinder 22, and between the torsion bar 10 and the input side cylinder 21, and where such electrical isolation was not provided.

The result of the comparative experiment was represented by the ratio % of a phase difference output detected by the phase difference detection circuit 54 when the torsion bar 10 was rotated without applying the torque, to a phase difference output FS when the maximum torque was applied within the range where the torque applied to the torsion bar 10 was proportional to the torsion angle of the torsion bar 10.

The comparative experiment above was performed under the following conditions; the directions of the generated magnetic flux of the first drive coil 31 and the second drive coil 32 were set to be opposite to each other, the drive frequency was set to be 20 kHz, the number of slits was 10, the length of the slit was 6 mm, the width of the slit was 2 mm, the material of the input side cylinder 21 was aluminum base alloy (A5056) with the thickness of 2 mm, the material of the output side cylinder 22 was aluminum base alloy (A5056) with the thickness of 2 mm, a distance between the input side cylinder 21 and the output side cylinder 22 was set to be 0.5 mm, and a distance (radius) from the rotation center axis to the central position of the space between the input side cylinder 21 and the output side cylinder 22 was set to be 25 mm.

As illustrated in FIG. 7b, the phase difference output showed a relatively large change depending on the change of the rotation speed r/min, in the following cases; where electrical conductivity was provided both between the torsion bar 10 and the output side cylinder 22, and between the torsion bar 10 and the input side cylinder 21 without providing electrical isolation, as indicated by outline circular marks in FIG. 7b, where electrical isolation was provided only between the torsion bar 10 and the input side cylinder 21 and electrical conductivity was provided between the torsion bar 10 and the output side cylinder 22, as indicated by square shaped marks in FIG. 7b, and where electrical isolation was provided only between the torsion bar 10 and the output side cylinder 22 and electrical conductivity was provided between the torsion bar 10 and the input side cylinder 21, as indicated by triangular marks in FIG. 7b.

On the other hand, the phase difference output was kept approximately to zero without depending on the rotation speed r/min, in the case where electrical isolation was provided both between the torsion bar 10 and the output side cylinder 22, and between the torsion bar 10 and the input side cylinder 21, as indicated by filled-in-black circular marks in FIG. 7b.

From the result of the comparative experiment, it is understood that an error which is dependent on the rotation speed of the torsion bar 10 is suppressible, by providing electrical isolation between the torsion bar 10 and the output side cylinder 22, and between the torsion bar 10 and the input side cylinder 21, by the use of the insulating members 11 and 12, respectively.

Here, the reason why the error depending on the rotation of the torsion bar 10 is suppressible by providing electrical isolation between the torsion bar 10 and the output side cylinder 22, and between the torsion bar 10 and the input side cylinder 21, is assumed as follows.

The magnetic flux generated by the first drive coil 31 and the second drive coil 32 introduces a kind of shaft current on the torsion bar 10, which is a rotating conductor. When electrical conductivity is provided among the torsion bar 10, the output side cylinder 22, and the input side cylinder 21, potential difference occurs between the output side cylinder 22 and the input side cylinder 21, thereby amplifying unbalance between the two magnetic circuits, and consequently, rotation dependence appears in the phase difference output. When electrical isolation is provided between the torsion bar 10 and the output side cylinder 22 and between the torsion bar 10 and the input side cylinder 21, potential difference does not occur between the output side cylinder 22 and the input side cylinder 21, thereby reducing the rotation dependence.

In the embodiment as described above, it is further possible to provide the reference slit 61 in such a manner as divided into two portions which are aligned in two rows in the radial direction, as shown in FIG. 2/1; one portion at least partially overlapping the first detection slit 62 at a position in the axial direction, and the other portion at least partially overlapping the second detection slit 63 at a position in the axial direction. In the case above, it is also possible to arrange these portions in such a manner as displaced from each other in the radial direction as shown in FIG. 2/2; one portion at least partially overlapping the position in the axial direction of the first detection slit 62, and the other portion at least partially overlapping the position in the axial direction of the second detection slit 63.

In the embodiment as described above, it is also preferable to arrange each of the slits in such a manner that the first detection slit 62 and the second detection slit 63 do not overlap the reference slit 61 when viewed from the radial direction, in only any one of the following cases; in the state where there is no torsion on the torsion bar 10, in the state where there is torsion on the torsion bar 10, or regardless of whether or not there is torsion on the torsion bar 10.

Here, following arrangements are considered as to the first detection slit 62 and the second detection slit 63 in the circumferential direction with respect to the reference slit 61; as shown in FIG. 8a1, in the state where there is no torsion on the torsion bar 10, the region of the reference slit 61 in the circumferential direction is brought into contact with the regions of the first detection slit 62 and the second detection slit 63 in the circumferential direction, without overlapping one another, and as shown in FIG. 8b1, in the state where there is no torsion on the torsion bar 10, the region of the reference slit 61 in the circumferential direction is provided with space from the regions of the first detection slit 62 and the second detection slit 63 in the circumferential direction, without overlapping one another.

In any of the arrangements as shown in FIG. 8a1 and FIG. 8b1, changes occur in the directions opposite to each other as shown in FIG. 8a2 and FIG. 8b2; as to distance in the circumferential direction between the first detection slit 62 and the reference slit 61, and as to a distance in the circumferential direction between the second detection slit 63 and the reference slit 61, according to a difference in rotation angle between the output side cylinder 22 and the input side cylinder 21, which is generated by the torsion on the torsion bar 10.

A combination of the intensity of the first magnetic flux component, the intensity of the second magnetic flux component, and the intensity of the third magnetic flux component and the fourth magnetic flux component, as described above, which are detected by the first detection coil 41, is associated with a distance in the circumferential distance between the reference slit 61 and the first detection slit 62. A combination of the intensity of the first magnetic flux component, the intensity of the second magnetic flux component, the intensity of the third magnetic flux component and the fourth magnetic flux component, which are detected by the second detection coil 42, is associated with a distance in the circumferential distance between the reference slit 61 and the second detection slit 63.

Therefore, also in the configuration above, when the first drive coil 31 and the second drive coil 32 being connected in series are driven by AC signals, different changes occurs depending on the torsion amount of the torsion bar 10, in the phase of the detection signal detected by the first detection coil 41 and the second detection coil 42.

Even in the case of the arrangement as shown in FIG. 8a and FIG. 8b, the reference slit 61 may be provided in such a manner as divided into two portions being aligned in two rows in the radial direction; a position in the axial direction of one portion at least partially overlapping the position in the axial direction of the first detection slit 62, and a position in the axial direction of the other portion at least partially overlapping the position in the axial direction of the second detection slit 63, as shown in FIG. 8c. In the case above, one portion of the reference slit 61 at least partially overlapping the position in the axial direction of the first detection slit 62, and the other portion at least partially overlapping the position in the axial direction of the second detection slit 63 may be arranged in such a manner as displaced in the circumferential direction as shown in FIG. 8d.

Here, a reason will be explained why it is preferable that the first detection slit 62 and the second detection slit 63 are placed with respect to the reference slit 61 in the circumferential direction in such a manner that the region in the circumferential direction of the reference slit 61 does not overlap the regions in the circumferential direction of the first detection slit 62 and the second detection slit 63, at least in the state that there is no torsion on the torsion bar 10.

Figure 9A:
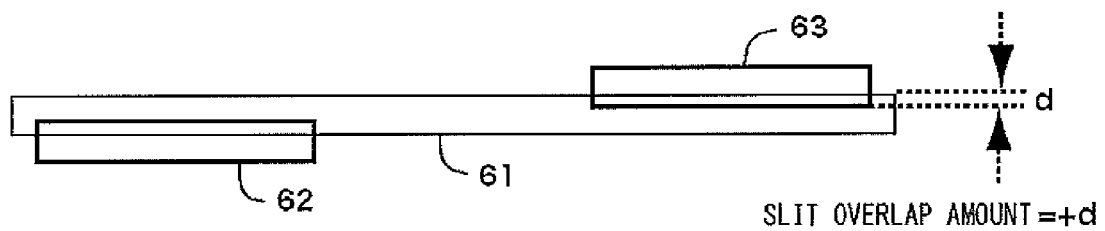
FIG. 9 illustrates overlap amount of the slits according to an embodiment of the present invention.

As shown in FIG. 9a, an overlap amount of the slits is defined.

Figure 9B:
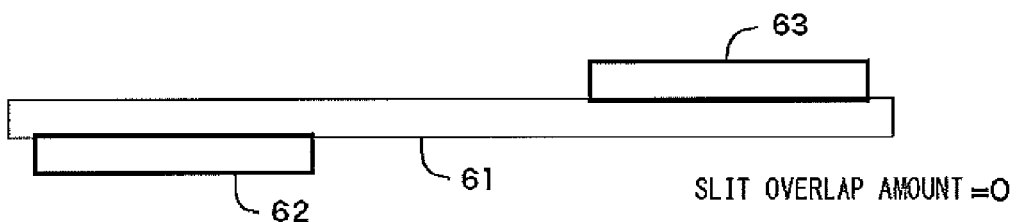
Figure 9C:
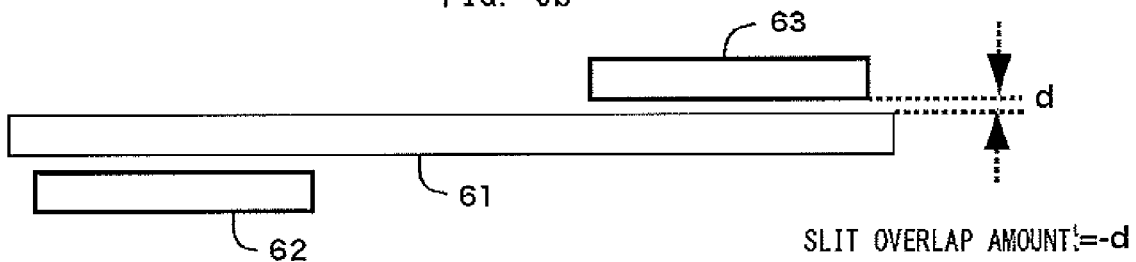

Specifically, as shown in FIG. 9a, in the state where there is no torsion on the torsion bar 10, "+d" is assumed as a slit overlap amount, when the region in the circumferential direction of the reference slit 61 overlaps the region of the first detection slit 62 and the second detection slit 63 in the circumferential direction, by the distance "d". As shown in FIG. 9b, in the state where there is no torsion on the torsion bar 10, the slit overlap amount is assumed as zero, when the region in the circumferential direction of the reference slit 61 comes into contact with the regions in the circumferential direction of the first detection slit 62 and the second detection slit 63, without any overlapping. As shown in FIG. 9c, in the state where there is no torsion on the torsion bar 10, "−d" is assumed as the slit overlap amount, when the region in the circumferential direction of the reference slit 61 is distant from the region in the circumferential direction of the first detection slit 62 and the second detection slit 63, without any overlapping.

Figure 10A:
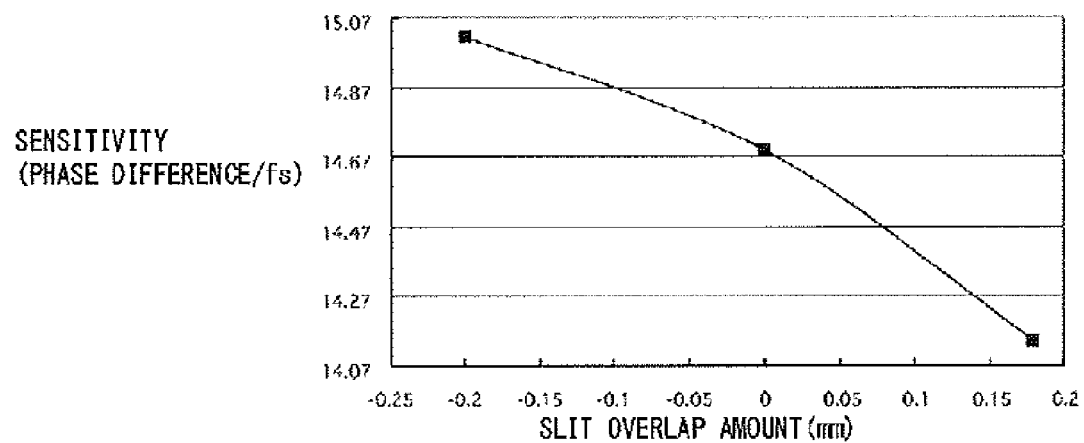
FIG. 10 illustrates results of comparative experiments representing an effect of the preferred arrangements of the slits according to an embodiment of the present invention.
Figure 10B:
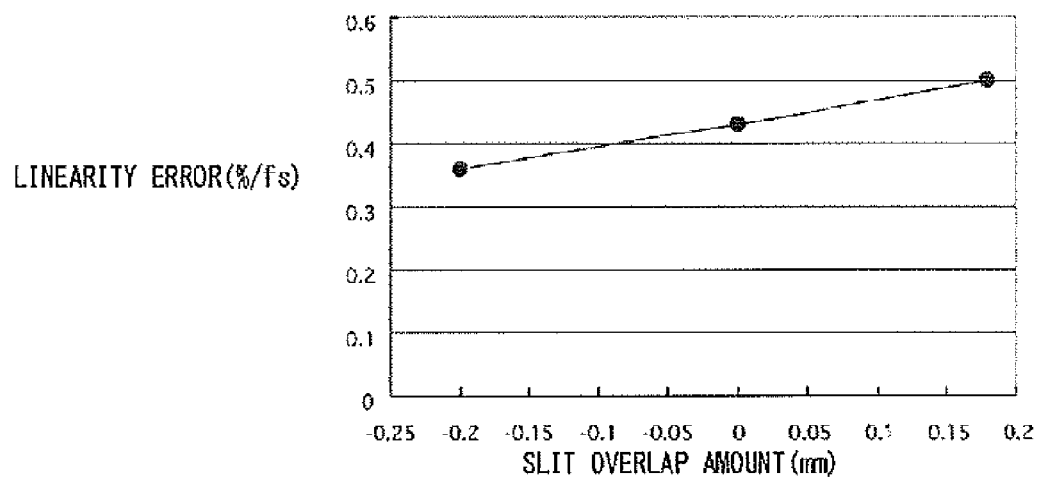

FIG. 10a and FIG. 10b illustrate results of the comparative experiment to obtain sensitivity and a linearity error of the torque sensor, while changing the slit overlap amount as described above.

It is to be noted that the torque sensor employed in the comparative experiment above had the following conditions; the direction of the magnetic flux generated in the first drive coil 31 was opposite to that of the magnetic flux generated in the second drive coil 32, the drive frequency was set to be 20 kHz, the number of slits was 15, the length of the first detection slit 62 and the second detection slit 63 was 6 mm, the width of each of the slits was 2 mm, a distance in the axial direction between the first detection slit 62 and the second detection slit 63 was 5 mm, a distance in the circumferential direction between each slit was 8.5 mm, the material of the input side cylinder 21 was aluminum base alloy (A5056) with the thickness of 2 mm, the material of the output side cylinder 22 was aluminum base alloy (A5056) with the thickness of 2 mm, a distance between the input side cylinder 21 and the output side cylinder 22 was set to be 0.5 mm, and a distance (radius) from the rotation center axis to the central position of the space between the input side cylinder 21 and the output side cylinder 22 was set to be 25 mm.

The torque sensor employed in the comparative experiment had the maximum torque FS being ±5 Nm within the range where the torque was proportional to the torsion angle of the torsion bar 10 (effective measurement range of the torsion bar 10), a moving distance in the circumferential direction of the reference slit 61 is ±0.18 mm, relative to the first detection slit 62 and the second detection slit 63, caused by the torsion of the torsion bar 10 when the maximum torque FS was applied.

FIG. 10a shows the phase difference detected by the phase difference detection circuit 54 when the maximum torque FS was applied to the torsion bar 10, in each of the cases where the slit overlap amount was set to −0.20 mm, 0.00 mm, and 0.18 mm.

It is understood from FIG. 10a, that the phase difference detected according to the torsion of the torsion bar 10 became larger, and the sensitivity of the torque sensor became more favorable, in the order in which the slit overlap amount was 0.18 mm, 0.00 mm, and −0.20 mm, where 0.18 mm was the slit overlap amount between the region in the circumferential direction of the reference slit 61 and those of the first detection slit 62 and the second detection slit 63, indicating that there was overlapping therebetween regardless of whether or not there was torsion on the torsion bar 10, 0.00 mm was the slit overlap amount between the region in the circumferential direction of the reference slit 61, and those of the first detection slit 62 and the second detection slit 63, indicating that there was no overlapping when there was no torsion on the torsion bar 10 and there was overlapping when there was torsion on the torsion bar 10, and −0.20 mm was the slit overlap amount between the region in the circumferential direction of the reference slit 61, and those of the first detection slit 62 and the second detection slit 63, indicating that there was no overlapping therebetween regardless whether or not there was torsion on the torsion bar 10.

FIG. 10b shows the linearity error in the phase difference which was detected when the maximum torque FS was applied to the torsion bar 10, in each of the cases where the slit overlap amount was set to −0.20 mm, 0.00 mm, and 0.18 mm.

It is understood from FIG. 10b, that the linearity error became smaller, in the order in which the slit overlap amount was 0.18 mm, 0.00 mm, and −0.20 mm, where 0.18 mm was the slit overlap amount between the region in the circumferential direction of the reference slit 61 and those of the first detection slit 62 and the second detection slit 63, indicating that there was an overlapping therebetween regardless of whether or not there was torsion on the torsion bar 10, 0.00 mm was the slit overlap amount between the region in the circumferential direction of the reference slit 61, and those of the first detection slit 62 and the second detection slit 63, indicating that there was no overlapping when there was no torsion on the torsion bar 10, and there was overlapping when there was torsion on the torsion bar 10, and −0.20 mm was the slit overlap amount between the region in the circumferential direction of the reference slit 61, and those of the first detection slit 62 and the second detection slit 63, indicating that there was no overlapping therebetween regardless of whether or not there was torsion on the torsion bar 10.

It is understood from the above results that enhancement of the sensitivity and reduction of the linearity error can be achieved, by configuring the arrangement in the circumferential direction of the first detection slit 62 and the second detection slit 63 relative to the reference slit 61, in such a manner that the region in the circumferential direction of the reference slit 61 does not overlap those of the first detection slit 62 and the second detection slit 63 in the state that there is no torsion on the torsion bar 10. Furthermore, it is also understood that more enhancement of the sensitivity and more reduction of the linearity error can be achieved, by configuring the arrangement in the circumferential direction of the first detection slit 62 and the second detection slit 63 relative to the reference slit 61, in such a manner that the region in the circumferential direction of the reference slit 61 does not overlap those of the first detection slit 62 and the second detection slit 63, regardless of whether or not there is torsion on the torsion bar 10. In the case where the region of the reference slit 61 in the circumferential direction is configured in such a manner as not overlapping those of the first detection slit 62 and the second detection slit 63, regardless of whether or not there is torsion on the torsion bar 10, a distance in the circumferential direction of the first detection slit 62 and that of the second detection slit 63 relative to the reference slit 61 are set to be optimum values, considering properties of the aforementioned sensitivity and linearity error in individual torque sensors.

Alternatively, the torque sensor relating to the present embodiment as described above may be configured as shown in FIG. 11*a*, FIG. 11*b*, FIG. 11*c*, and FIG. 11*d*.

Here, each figure schematically illustrates the torque sensor; FIG. 11*a* is a front view, FIG. 11*b* is a left side view, FIG. 11*c* is a right side view, and FIG. 11*d* is a sectional view.

As illustrated, this configuration is established by adding a first compensating coil 410 and a second compensating coil 420 to the configuration of the torque sensor as shown in FIG. 1*a* to FIG. 1*d*.

As is shown, the detection coil 41, the second detection coil 42, the first compensating coil 410, and the second compensating coil 420 are wound around the output side cylinder 22 coaxially with the rotation axis of the torsion bar 10, and these coils are arranged in the axial direction, in the order as the following; the second compensating coil 420, the first detection coil 41, the second detection coil 42, and the first compensating coil 410.

The first detection coil 41 and the first compensating coil 410 are connected in series, and the second detection coil 42 and the second compensating coil 420 are connected in series. As shown in FIG. 11*d*, a winding direction of the first drive coil 31 is opposite to the winding direction of the second drive coil 32 (i.e., the directions of generated magnetic flux are also opposite to each other). The first detection coil 41 and the first compensating coil 410 are wound in the directions opposite to each other, and the second detection coil 42 and the second compensating coil 420 are wound in the directions opposite to each other.

Figure 12A:
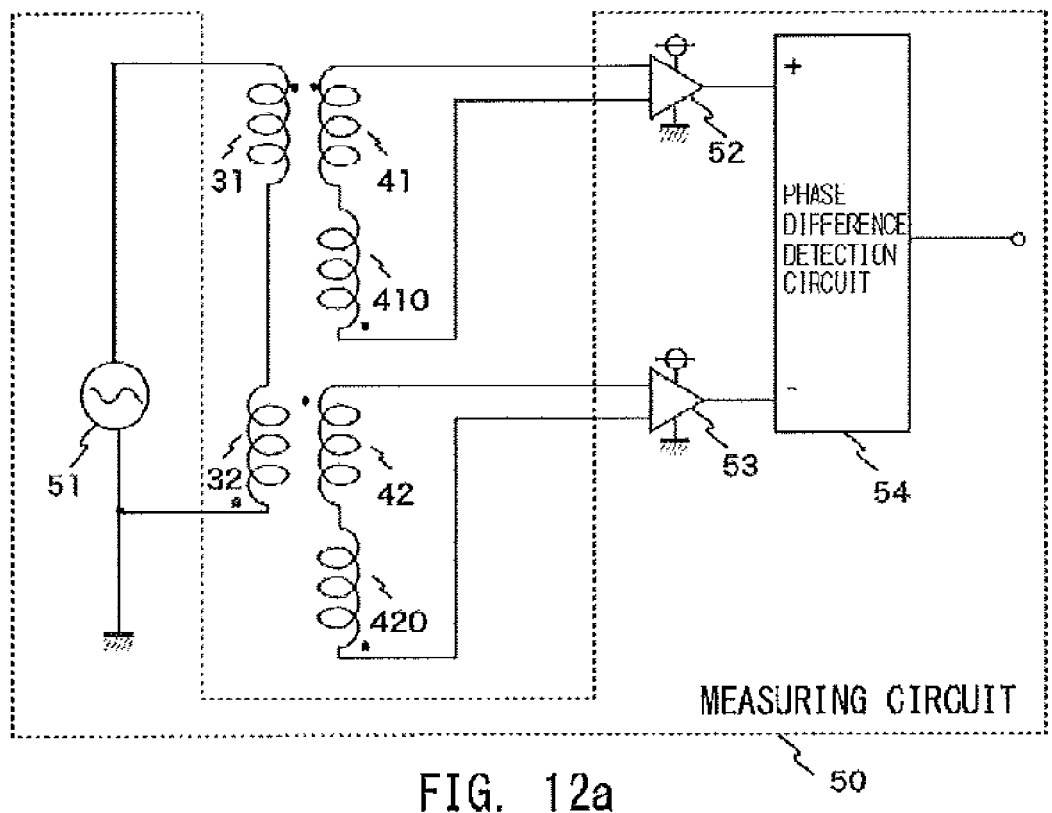
FIG. 12 illustrates configuration examples where the compensating coils are provided in the measuring circuit of the torque sensor according to an embodiment of the present invention.

In the case where the first compensating coil 410 and the second compensating coil 420 are provided as described above, in the measuring circuit 50 as shown in FIG. 12*a*, the first differential amplifier 52 amplifies a detection signal generated by an induced electromotive force on both ends of the first detection coil 41 and the first compensating coil 410 being connected in series, and the second differential amplifier 53 amplifies a detection signal generated by the induced electromotive force, on the both ends of the second detection coil 42 and the second compensation coil 420 being connected in series.

Then, the phase difference detection circuit 54 detects a phase difference between the detection signal amplified by the first differential amplifier 52 and the detection signal amplified by the second differential amplifier 53. According to the magnitude of the phase difference detected by the phase difference detection circuit 54, it is possible to represent a torsion amount of the torsion bar 10, i.e., the torque applied to the torsion bar 10.

As discussed above, the winding directions of the first detection coil 41 and the first compensating coil 410, connected in series, are opposite to each other, and the winding directions of the second detection coil 42 and the second compensating coil 420, connected in series, are opposite to each other as well. Therefore, signal component induced in the first detection coil 41 by disturbance such as a noise is canceled out by the signal induced by the disturbance in the first compensating coil 410, and signal component induced in the second detection coil 42 by disturbance such as a noise is canceled out by the signal induced by the disturbance in the second compensating coil 420.

Figure 13A:
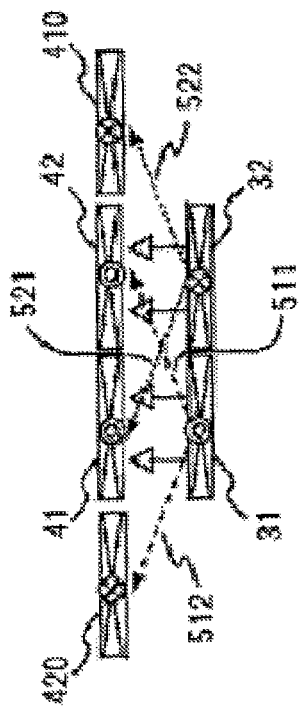
FIG. 13 illustrates results of the comparative experiment representing an effect of the compensating coils of the torque sensor according to an embodiment of the present invention.
Figure 13:
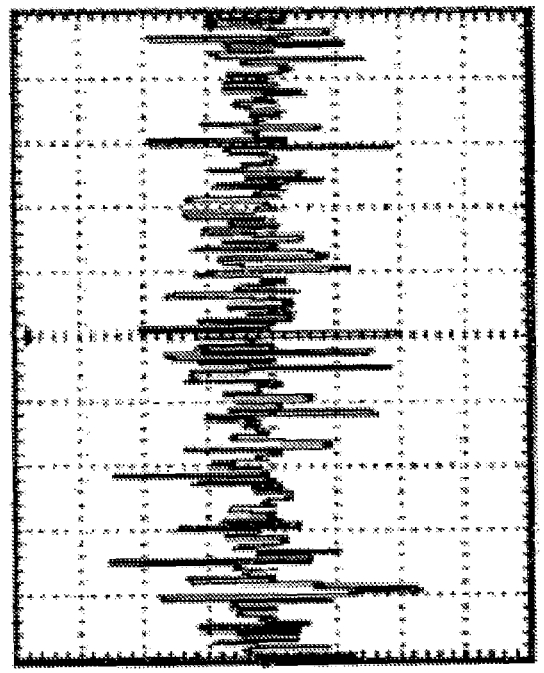
Figure 13:
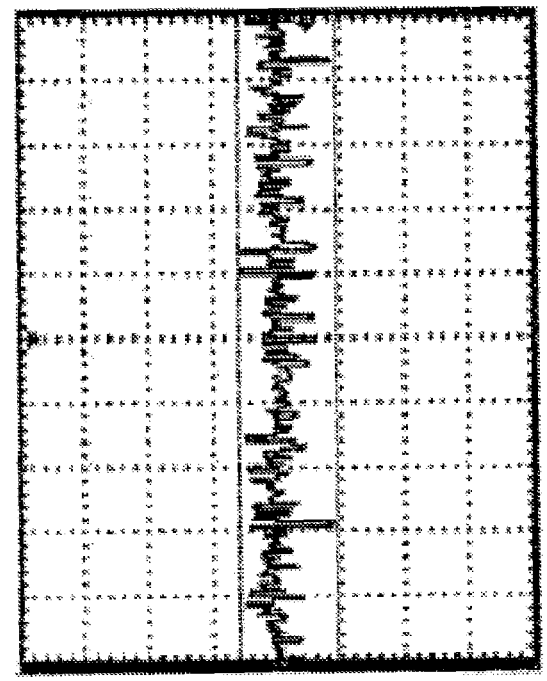

As described above, the coils are arranged in the following order as illustrated in FIG. 13*a*; the second compensating coil 420, the first detection coil 41, the second detection coil 42, and the first compensating coil 410. In addition, the first drive coil 31 is placed in such a manner as facing to the first detection coil 41, and the second drive coil 32 is placed in such a manner as facing the second detection coil 42.

Therefore, most of an interfering component being the signal component in the second detection coil 42 induced by the magnetic flux component 511, which reaches the second detection coil 42 from the first drive coil 31, can be canceled out by the signal component in the second compensating coil 420 induced by the magnetic flux component 512, which reaches the second compensating coil 420 from the first drive coil 31. In a similar manner, most of an interfering component being the signal component in the first detection coil 41 induced by the magnetic flux component 521, which reaches the first detection coil 41 from the second drive coil 32, can be canceled out by the signal component in the first compensating coil 410 induced by the magnetic flux component 522, which reaches the first compensating coil 410 from the second drive coil 32.

It is to be noted that a reason why the direction of the generated magnetic flux of the first drive coil 31 and that of the second drive coil 32 are opposite to each other as described above is to suppress an error which is dependent on the rotation of the torsion bar 10.

Here, an explanation will be made as to an effect brought about by the first compensating coil 410 and the second compensating coil 420 which are provided as described above.

Figure 12B:
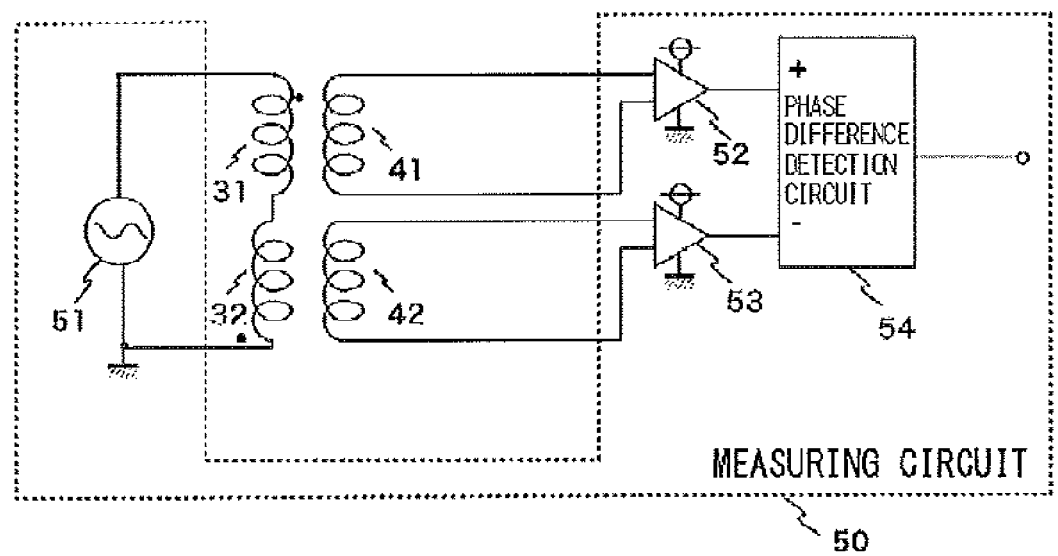

FIGS. 13*b*1 and 13*b*2 show the phase difference measured by the measuring circuit 50 when the torsion bar was rotated without applying any load. FIG. 13*b*1 shows the phase difference measured in the configuration where the first compensating coil 410 and the second compensating coil 420 were provided as shown in FIG. 12*a*. FIG. 13*b*2 shows the phase difference measured in the configuration where both ends of the first detection coil 41 were connected to the first differential amplifier 52 and both ends of the second detection coil 42 were connected to the second differential amplifier 53, as shown in FIG. 12*b*, without providing the first compensating coil 410 and the second compensating coil 420.

In the example here, since the torsion bar was rotated without applying any load, the phase difference to be detected is supposed to be zero. As shown in FIG. 13*b*2, in the case where the first compensating coil 410 and the second compensating coil 420 were not provided, the measured phase difference fluctuated in a large scale due to the disturbance such as a noise. On the other hand, as shown in FIG. 13*b*1, in the case where the first compensating coil 410 and the second compensating coil 420 were provided, the fluctuation of the measured phase difference due to the disturbance such as a noise, was small, and the magnitude of the fluctuation was approximately one-third of the fluctuation in the case where the first compensating coil 410 and the second compensating coil 420 were not provided.

Consequently, it is understood that when the first compensating coil 410 and the second compensating coil 420 are provided, it is possible to suppress an influences caused by the disturbance such as a noise, and deterioration of measuring precision due to the interference of the magnetic flux signal is also suppressed.

In the embodiment as described above, it is further possible to configure such that the first drive coil 31 and the second drive coil 32 are provided on the side of the outer circumference of the output side cylinder 22, and the first detection coil 41, the second detection coil 42, the first compensating coil 410, and the second compensating coil 420 are placed between the inner cylindrical portion and the outer cylindrical portion of the input side cylinder 21. It is further possible to configure such that the reference slit 61 is provided on the input side cylinder 21, and the first detection slit 62 and the second detection slit 63 are provided on the output side cylinder 22. It is also possible to fix the input side cylinder 21 on the output side of the torsion bar, and the output side cylinder 22 on the input side of the torsion bar.

What is claimed is:

1. A torque sensor, comprising,
a torsion bar,
a first cylinder made of a non-magnetic conductor, being fixed on one end of the torsion bar, and arranged coaxially with the torsion bar,
a second cylinder made of a non-magnetic conductor, being fixed on the other end of the torsion bar, and arranged coaxially with the torsion bar in the form of being inserted into the first cylinder, and
a measuring part,
wherein,
either one of the first cylinder and the second cylinder comprises a reference slit,
either one of the first cylinder and the second cylinder, the cylinder not having the reference slit provided thereon, comprises a first detection slit and a second detection slit, being placed at positions different in an axial direction, and
the measuring part comprises,
a drive coil arranged coaxially with the torsion bar, on one side, either of the inner circumferential side of the second cylinder, and the outer circumferential side of the first cylinder,
a detection coil arranged coaxially with the torsion bar, on the other side, any side of the inner circumferential side of the second cylinder, and the outer circumferential side of the first cylinder, not having the drive coil arranged thereon,
a drive circuit for subjecting the drive coil to AC driving, and
a measuring circuit,
wherein,
the first detection slit and the second detection slit are arranged in such a manner that each position in the axial direction of the detection slits overlaps a position of the reference slit at least partially, and a position in the circumferential direction of the first detection slit with respect to a portion of the reference slit that the position in the axial direction of the first detection slit overlaps, is different from a position in the circumferential direction of the second detection slit with respect to a portion of the reference slit that the position in the axial direction of the second detection slit overlaps,
the drive coil comprises a first drive coil and a second drive coil placed at positions different in the axial direction,
the detection coil comprises a first detection coil and a second detection coil placed at positions different in the axial direction,
the first drive coil and the first detection coil are arranged in such a manner that the positions thereof in the axial direction overlaps the first detection slit at least partially, and the second drive coil and the second detection coil are arranged in such a manner that the positions thereof in the axial direction overlaps the second detection slit at least partially,
the measuring circuit detects a phase difference between a voltage signal induced by the first detection coil, and a voltage signal induced by the second detection coil, and
a direction of generated magnetic flux of the first drive coil and a direction of generated magnetic flux of the second drive coil are opposite to each other.

2. The torque sensor according to claim 1, wherein,
the torsion bar is electrically connected to a ground level of the measuring circuit.

3. The torque sensor according to claim 2, wherein,
the reference slit comprises a first reference slit and a second reference slit, being placed at different positions in the axial direction, the first reference slit overlapping a position in the axial direction of the first detection slit at least partially, and the second reference slit overlapping a position in the axial direction of the second detection slit at least partially.

4. The torque sensor according to claim 1, wherein,
the torsion bar is electrically insulated from the first cylinder, and the torsion bar is electrically insulated from the second cylinder.

5. The torque sensor according to claim 4, wherein,
the reference slit comprises a first reference slit and a second reference slit, being placed at different positions in the axial direction, the first reference slit overlapping a position in the axial direction of the first detection slit at least partially, and the second reference slit overlapping a position in the axial direction of the second detection slit at least partially.

6. The torque sensor according to claim 1, wherein,
in the state where there is no torsion on the torsion bar, a region in the circumferential direction of the first detection slit does not overlap a region in the circumferential direction of a portion of the reference slit, the portion overlapping a position in the axial direction of the first detection slit, and in the state where there is no torsion on the torsion bar, a region in the circumferential direction of the second detection slit does not overlap a region in the circumferential direction of a portion of the reference slit, the portion overlapping a position in the axial direction of the second detection slit.

7. The torque sensor according to claim 6, wherein,
within a predetermined range of the torsion on the torsion bar, the region in the circumferential direction of the first detection slit does not overlap the region in the circumferential direction of the portion of the reference slit, the portion overlapping the position in the axial direction of the first detection slit, and within the predetermined range of the torsion on the torsion bar, the region in the circumferential direction of the second detection slit does not overlap the region in the circumferential direction of the portion of the reference slit, the portion overlapping the position in the axial direction of the second detection slit.

8. The torque sensor according to claim 6, wherein,
the reference slit comprises a first reference slit and a second reference slit, being placed at different positions in the axial direction, the first reference slit overlapping a position in the axial direction of the first detection slit at least partially, and the second reference slit overlapping a position in the axial direction of the second detection slit at least partially.

9. The torque sensor according to claim 1, wherein,
the reference slit comprises a first reference slit and a second reference slit, being placed at different positions in the axial direction, the first reference slit overlapping a position in the axial direction of the first detection slit at least partially, and the second reference slit overlapping a position in the axial direction of the second detection slit at least partially.

10. A torque sensor comprising,
a torsion bar,
a first cylinder made of a non-magnetic conductor, being fixed on one end of the torsion bar, and arranged coaxially with the torsion bar,
a second cylinder made of a non-magnetic conductor, being fixed on the other end of the torsion bar, and arranged coaxially with the torsion bar in the form of being inserted into the first cylinder, and
a measuring part,
wherein,
either one of the first cylinder and the second cylinder comprises a reference slit,
either one of the first cylinder and the second cylinder, the cylinder not having the reference slit provided thereon, comprises a first detection slit and a second detection slit being placed at positions different in an axial direction, and
the measuring part comprises,
a first drive coil and a second drive coil being arranged on either one of the inner circumferential side of the second cylinder and the outer circumferential side of the first cylinder, coaxially with the rotation axis of the torsion bar, at positions different in the axial direction respectively,
a first detection coil, a second detection coil, a first compensating coil, and a second compensating coil being arranged on the side where the first drive coil and the second drive coil are not arranged, either of on the inner circumferential side of the second cylinder and on the outer circumferential side of the first cylinder, coaxially with the rotation axis of the torsion bar, at positions different in the axial direction respectively,
a drive circuit for subjecting the drive coils to AC driving, and
a measuring circuit,
wherein,
the first detection slit and the second detection slit are arranged in such a manner that each position in the axial direction of the detection slits overlaps a position in the axial direction of the reference slit at least partially, and the position in the circumferential direction of the first detection slit with respect to a portion of the reference slit that the position in the axial direction of the first detection slit overlaps, is different from a position in the circumferential direction of the second detection slit with respect to a portion of the reference slit that the position in the axial direction of the second detection slit overlaps,
the first detection coil and the first compensating coil are connected in series, the second detection coil and the second compensating coil are connected in series, a winding direction of the first detection coil and a winding direction of the first compensating coil are opposite to each other, a winding direction of the second detection coil and a winding direction of the second compensating coil are opposite to each other,
the first drive coil and the first detection coil are arranged in such a manner that the positions thereof in the axial direction overlap the first detection slit at least partially, the second drive coil and the second detection coil are arranged in such a manner that the positions thereof in the axial direction overlap the second detection slit at least partially, the first compensating coil and the second compensating coil are arranged in such a manner that the positions in the axial direction do not overlap the first detection slit and the second detection slit, and
the measuring circuit detects a phase difference between a voltage signal induced on both ends of the first detection coil and the first compensating coil being connected in series, and a voltage signal induced on both ends of the second detection coil and the second compensating coil being connected in series.

11. The torque sensor according to claim 10, wherein,
as to the axial direction, the first detection coil is adjacent to the second detection coil, the first compensating coil is arranged in such a manner that the second detection coil is positioned between the first compensating coil and the first detection coil, and the second compensating coil is arranged in such a manner that the first detection coil is positioned between the second compensating coil and the second detection coil.

12. The torque sensor according to claim 10, wherein,
the reference slit comprises a first reference slit and a second reference slit, being placed at different positions in the axial direction, the first reference slit overlapping a position in the axial direction of the first detection slit at least partially, and the second reference slit overlapping a position in the axial direction of the second detection slit at least partially.

13. A torque sensor, comprising,
a torsion bar,
a first cylinder made of a non-magnetic conductor, being fixed on one end of the torsion bar, and arranged coaxially with the torsion bar,
a second cylinder made of a non-magnetic conductor, being fixed on the other end of the torsion bar, and arranged coaxially with the torsion bar in the form of being inserted into the first cylinder, and
a measuring part,
wherein,
either one of the first cylinder and the second cylinder comprises a reference slit,
either one of the first cylinder and the second cylinder, the cylinder not having the reference slit provided thereon, comprises a first detection slit and a second detection slit being placed at positions different in an axial direction, and
the measuring part comprises,
a drive coil arranged coaxially with the torsion bar, on one side, either of the inner circumferential side of the second cylinder, and the outer circumferential side of the first cylinder,
a detection coil arranged coaxially with the torsion bar, on the other side, any side of the inner circumferential side of the second cylinder, and the outer circumferential side of the first cylinder, not having the drive coil arranged thereon,
a drive circuit for subjecting the drive coil to AC driving, and
a measuring circuit,
wherein, the first detection slit and the second detection slit are arranged in such a manner that each position in the axial direction of the detection slits overlaps a position of the reference slit at least partially, and a position of the first detection slit with respect to a portion of the reference slit that the position in the axial direction of the first detection slit overlaps, is different from a position of the second detection slit with respect to a portion of the reference slit that the position in the axial direction of the second detection slit overlaps, the detection coil comprises a first detection coil and a second detection coil placed at positions different in the axial direction, the first detection coil is arranged in such a manner that the position thereof in the axial direction overlaps the first detection slit at least partially, and the second detection coil is arranged in such a manner that the position thereof in the axial direction overlaps the second detection slit at least partially, the measuring circuit detects a phase difference between a voltage signal induced by the first detection coil, and a voltage signal induced by the second detection coil, and the torsion bar is electrically connected to a ground level of the measuring circuit.

14. The torque sensor according to claim 13, wherein,
the reference slit comprises a first reference slit and a second reference slit, being placed at different positions in the axial direction, the first reference slit overlapping a position in the axial direction of the first detection slit at least partially, and the second reference slit overlapping a position in the axial direction of the second detection slit at least partially.

15. A torque sensor, comprising,
a torsion bar,
a first cylinder made of a non-magnetic conductor, being fixed on one end of the torsion bar, and arranged coaxially with the torsion bar,
a second cylinder made of a non-magnetic conductor, being fixed on the other end of the torsion bar, and arranged coaxially with the torsion bar in the form of being inserted into the first cylinder, and
a measuring part,
wherein,
either one of the first cylinder and the second cylinder comprises a reference slit,
either one of the first cylinder and the second cylinder, the cylinder not having the reference slit provided thereon, comprises a first detection slit and a second detection slit being placed at positions different in an axial direction, and
the measuring part comprises,
a drive coil arranged coaxially with the torsion bar, on one side, either of the inner circumferential side of the second cylinder, and the outer circumferential side of the first cylinder,
a detection coil arranged coaxially with the torsion bar, on the other side, any side of the inner circumferential side of the second cylinder, and the outer circumferential side of the first cylinder, not having the drive coil arranged thereon,
a drive circuit for subjecting the drive coil to AC driving, and
a measuring circuit,
wherein,
the first detection slit and the second detection slit are arranged in such a manner that each position in the axial direction of the detection slits overlaps a position of the reference slit at least partially, and a position in the circumferential direction of the first detection slit with respect to a portion of the reference slit that the position in the axial direction of the first detection slit overlaps, is different from a position in the circumferential direction of the second detection slit with respect to a portion of the reference slit that the position in the axial direction of the second detection slit overlaps, the detection coil comprises the first detection coil and the second detection coil placed at positions different in the axial direction, the first detection coil is arranged in such a manner that the position thereof in the axial direction overlaps the first detection slit at least partially, and the second detection coil is arranged in such a manner that the position thereof in the axial direction overlaps the second detection slit at least partially, the measuring circuit detects a phase difference between a voltage signal induced by the first detection coil, and a voltage signal induced by the second detection coil, and the torsion bar is electrically insulated from the first cylinder, and the torsion bar is electrically insulated from the second cylinder.

16. The torque sensor according to claim 15, wherein,
the reference slit comprises a first reference slit and a second reference slit, being placed at different positions in the axial direction, the first reference slit overlapping a position in the axial direction of the first detection slit at least partially, and the second reference slit overlapping a position in the axial direction of the second detection slit at least partially.

17. A torque sensor, comprising,
a torsion bar,
a first cylinder made of a non-magnetic conductor, being fixed on one end of the torsion bar, and arranged coaxially with the torsion bar,
a second cylinder made of a non-magnetic conductor, being fixed on the other end of the torsion bar, and arranged coaxially with the torsion bar in the form of being inserted into the first cylinder, and
a measuring part,
wherein,
either one of the first cylinder and the second cylinder comprises a reference slit,
either one of the first cylinder and the second cylinder, the cylinder not having the reference slit provided thereon, comprises a first detection slit and a second detection slit being placed at positions different in an axial direction, and
the measuring part comprises,
a drive coil arranged coaxially with the torsion bar, on one side, either of the inner circumferential side of the second cylinder, and the outer circumferential side of the first cylinder,
a detection coil arranged coaxially with the torsion bar, on the other side, any side of the inner circumferential side of the second cylinder, and the outer circumferential side of the first cylinder, not having the drive coil arranged thereon,
a drive circuit for subjecting the drive coil to AC driving, and
a measuring circuit,
wherein,
the first detection slit and the second detection slit are arranged in such a manner that each position in the axial direction of the detection slits overlaps a position of the reference slit at least partially, and a position in the circumferential direction of the first detection slit with respect to a portion of the reference slit that the position in the axial direction of the first detection slit overlaps, is different from a position in the circumferential direction of the second detection slit with respect to a portion of the reference slit that the position in the axial direction of the second detection slit overlaps, the detection coil comprises a first detection coil and a second detection coil placed at positions different in the axial direction, the first detection coil is arranged in such a manner that the position thereof in the axial direction overlaps the first detection slit at least partially, and the second detection coil is arranged in such a manner that the position thereof in the axial direction overlaps the second detection slit at least partially, the measuring circuit detects a phase difference between a voltage signal induced by the first detection coil, and a voltage signal induced by the second detection coil, and in the state where there is no torsion on the torsion bar, a region in the circumferential direction of the first detection slit does not overlap a region in the circumferential direction of a portion of the reference slit, the portion overlapping a position in the axial direction of the first detection slit, and in the state where there is no torsion on the torsion bar, a region in the circumferential direction of the second detection slit does not overlap a region in the circumferential direction of a portion of the reference slit, the portion overlapping a position in the axial direction of the second detection slit.

18. The torque sensor according to claim 17, wherein, within a predetermined range of the torsion on the torsion bar, the region in the circumferential direction of the first detection slit does not overlap the region in the circumferential direction of the portion of the reference slit, the portion overlapping the position in the axial direction of the first detection slit, and within the predetermined range of the torsion on the torsion bar, the region in the circumferential direction of the second detection slit does not overlap the region in the circumferential direction of the portion of the reference slit, the portion overlapping the position in the axial direction of the second detection slit.

19. The torque sensor according to claim 17, wherein, the reference slit comprises a first reference slit and a second reference slit, being placed at different positions in the axial direction, the first reference slit overlapping a position in the axial direction of the first detection slit at least partially, and the second reference slit overlapping a position in the axial direction of the second detection slit at least partially.

* * * * *